United States Patent
Motokawa et al.

(10) Patent No.: US 6,401,187 B1
(45) Date of Patent: Jun. 4, 2002

(54) MEMORY ACCESS OPTIMIZING METHOD

(75) Inventors: Keiko Motokawa; Hiroyasu Nishiyama, both of Kawasaki; Sumio Kikuchi, Machida, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/581,361

(22) PCT Filed: Dec. 10, 1997

(86) PCT No.: PCT/JP97/04542

§ 371 (c)(1),
(2), (4) Date: Jun. 12, 2000

(87) PCT Pub. No.: WO99/30231

PCT Pub. Date: Jun. 17, 1999

(51) Int. Cl.[7] ............................................. G06F 12/08
(52) U.S. Cl. ........................................ 711/213; 711/138
(58) Field of Search .............................. 711/213, 138; 717/9

(56) References Cited

U.S. PATENT DOCUMENTS 5,784,711 A * 7/1998 Chi ............................. 711/213
5,838,945 A * 11/1998 Emberson ................... 395/376
6,314,561 B1 * 11/2001 Funk et al. ...................... 717/9

OTHER PUBLICATIONS

Nakamura et al., "Effectiveness of Register Preloading on CP–PACS Node Processor", 1998, IEEE, p 83–90.*
Jegou et al., "Speculative Prefetching", 1993, ACM, p 57–66.*
Chen et al., "An Efficient Architecture for Loop Based Data Preloading", 1992, IEEE, p 92–101.*
"Design and Evaluation of Compiler Algorithm for Prefetching, Architectural Support for Programming Languages and Operating Systems", 1992, p 62–73.*
"Data Bus Technology RISC–based Massively Parallel Supercomputer", Journal of IPSJ, vol. 38 No. 6, 1997, p. 485–492.*
"A Data Locality Optimizing Algorithm, Programming Language Design and Implementation", 1991, p 30–40.*
"Cross–loop Reuse Analysis and its Application to Cache Optimizations, Workshop on Languages and Compilers for Parallel Computing", 1996, p 1–15.*
"Software Pipelining: An Effective Scheduling Technique for VLIW Machines", 1988, p 318–328.*
"Tolerating Data Access Latency with Register Preloading", Proceedings of the 1992 International Conference on Supercomputing, 1992, p 1–11.*

* cited by examiner

Primary Examiner—Kevin L. Ellis
(74) Attorney, Agent, or Firm—Antonelli, Terry, Stout & Kraus, LLP

(57) ABSTRACT

The present invention provides a memory access optimizing method which judges an access method suitable for each of memory accesses and executes the preload optimization and prefetch optimization, according to the judgement result, for an architecture equipped with a prefetch mechanism to write the data on a main storage device into a cache memory and a preload mechanism to write the data on the main storage device into a register without writing it into the cache memory. The memory access method judging step analyzes whether or not there is a designation of a memory access method by a user. Moreover, the memory access method judging step investigates whether or not the data are already in a cache memory, whether or not the data compete with other data for a cache, whether or not the data are to be referred to again later, and whether or not the data fulfill the restriction on register resources.

9 Claims, 26 Drawing Sheets

FIG.3

```
double a [100] [100] , b [100] [100] , c [100] [100] , s ;
void func ( )
{
    int      i , j ;
```
    #prefetch  a , c [ i ] [ j ]  ~301 preload   b                  ~302
```
    for ( i = 0 ; i < 100 ; i++) {
        for ( j = 0 ; j < 100 ; j++) {
            s = s + a [ i ] [ j ] * b [ j ] [ i ] + c [ i ] [ j ] ;
        }
    }
}
```

FIG.4 cc  −Oprefetch , loop1 , a , c [ i ] [ j ]   −Opreload , loop1 , b   func.c
    ⏟                                        ⏟
    401                                      402

FIG.6

| LOOP NUMBER 601 | BASIC BLOCK 602 | PREFETCH INSTRUC-TION STATEMENT 603 | PRELOAD INSTRUC-TION STATEMENT 604 |
|---|---|---|---|
| 1 | BB3 | a, c [ i ] [ j ] | b |
| 2 | BB2, BB4 | - | - |

FIG.7

| LOOP 701 | MEMORY ACCESS 702 | ACCESS METHOD 703 |
|---|---|---|
| 1 | a [ i ] | PREFETCH |
| 1 | a [ j ] | PRELOAD |
| 1 | a [ i+1 ] | LOAD |
| 2 | b [ j ] | PRELOAD |
| 3 | c [ k ] | PRELOAD |

FIG.17

| | | | | | |
|---|---|---|---|---|---|
| 1701 | LOOP NUMBER | 1 | 2 | 3 | 4 |
| 1702 | BASIC BLOCK | BB2 | BB5 | BB8 | BB11 |
| 1703 | PRECEDING LOOP | - | 1 | 2 | 3 |
| 1704 | NEXT LOOP | 2 | 3 | 4 | - |
| 1705 | CONTROL VARIABLE | i | i | i | i |
| 1706 | LOWER LIMIT VALUE OF CONTROL VARIABLE | 0 | 0 | 0 | 0 |
| 1707 | UPPER LIMIT VALUE OF CONTROL VARIABLE | 99 | 99 | 399 | 399 |
| 1708 | INCREMENTAL VALUE OF CONTROL VARIABLE | 1 | 1 | 1 | 1 |

FIG.20

| MEMORY ACCESS (2001) | SELF-REUSE (2002) | GROUP REUSE (2003) |
|---|---|---|
| a [ i ] | PRESENCE | 1 |
| a [ i+2] | PRESENCE | 1 |
| b [2*i] | PRESENCE | ABSENCE |
| x [ i ] | PRESENCE | ABSENCE |
| c [x [ i ]] | ABSENCE | ABSENCE |
| d [ i ] | PRESENCE | 2 |
| d [ i+100] | PRESENCE | 2 |
| b [2*i+1024] | PRESENCE | ABSENCE |

| GROUP NUMBER (2004) | LEADING REFERENCE (2005) | OTHER REFERENCES (2006) |
|---|---|---|
| 1 | a [ i ] | a [ i+2] |
| 2 | d [ i+100] | d [ i ] |

FIG.27

```
double  a [200] , b [2000] , c [100] , d [200] , s ;
int     x [100] ;
void func ( )
{
    int        i ;

for ( i = 0 ; i < 100 ; i ++) {
        s += a [ i ] + a [ i+2] + b [2*i ] + c [x [ i ]]
            + d [ i ] + d [ i+100] + b [2*i+1024] ;
    }
}
```

FIG.28

```
double      v1, v2, v3, v4 ;
double      a [100] , b [400] , c [400] ;

void func ( )
{
    int        i ;

/* LOOP 1 */
    for ( i = 0 ; i < 100 ; i++) {
        v1 += a [ i ] ;
    }

/* LOOP 2 */
    for ( i = 0 ; i < 100 ; i++) {
        v2 += a [ i ] + b [ i *4] + c [ i *4] ;
    }

/* LOOP 3 */
    for ( i = 0 ; i < 400 ; i++) {
        v3 += b [ i ] ;
    }

/* LOOP 4 */
    for ( i = 0 ; i < 400 ; i++) {
        v4 += c [ i ] ;
    }

}
```

MEMORY ACCESS OPTIMIZING METHOD

TECHNICAL FIELD

The present invention relates in general to a compiler which is designed in such a way as to take aim at a processor including a cache memory, and more particularly to a memory access optimizing method of optimizing a load system for referring to elements of an array.

BACKGROUND ART

A latency for an access to a main storage has been lengthened along with increasing of the processing speed of a microprocessor so that the influence has been increased which is exerted on the execution performance of a program. Many processors are provided with cache memories each of which has a quicker access than that of a main storage and each of which has a relatively small capacity to reduce the number of accesses to a main storage having a long latency. In other words, a memory access instruction accesses a cache memory with a short latency in cache hit, while accesses a main storage only in cache miss.

As for one method of hiding a latency required for an access to a memory in cache miss, there is prefetching (i.e., software prefetching). The prefetch instruction loads data on a main storage into a cache memory with non-blocking. A compiler has previously issued the prefetch instruction by employing the scheduling technique such as the software pipelining so that the different arithmetic is executed for a period of time until the prefetch has been completed. Thereafter, data on the cache memory is accessed by a load instruction. By adopting this method, it is possible to hide the latency resulting from a memory access. Such a prefetch method, for example, is described in an article of Todd C. Mowry et al.: "Design and Evaluation of Compiler Algorithm for Prefetching, Architectual Support for Programming Languages and Operating Systems", pp. 62 to 73, 1992 for example.

As for another mechanism for hiding a latency required for a memory access, there is a method called the preload. This method is described in an article of Sawamoto et al.: "Data Bus Technology of RISC-based Massively Parallel Supercomputer", Journal of IPSJ (Information Processing Society of Japan), Vol. 38, No. 6, pp. 485 to 492, 1997. The preload instruction writes directly data on a main storage to a register by bypassing a cache memory. In the compiler, by employing the scheduling technique such as the software pipelining the preload instruction and the arithmetic instruction using the data are separated from each other by equal to or longer than a memory latency, thereby hiding the memory latency.

The preload has the following advantage as compared with the prefetch. That is, since the data can be loaded from the main storage into the register in accordance with one preload instruction, any of the instructions does not need to be added as in the prefetch and hence the number of issued instructions does not increase. In addition, since no data is written to the cache memory, the memory throughput is excellent. Also, while the prefetch may be driven out from the cache memory before having used the data in some cases, the preload writes directly the data to the register and this is free from such anxiety.

On the other hand, the prefetch has the following advantage. That is, since the prefetch instruction does not occupy the register, this does not increase the register pressure. In addition, in accordance with the prefetch instruction, the data for one cache line are collectively written to the cache memory in response to one memory request, and the data of interest can be effectively utilized in the operation of accessing the continuous data.

The architecture described in the above-mentioned article by Sawamoto et al. includes the mechanisms of both of the prefetch and the preload. Therefore, the preload can be applied to the floating-point data, while the prefetch can be applied to both of the fixed-point data and the floating-point data. Then, it is described in the above-mentioned article by Sawamoto et al. to generate the code with which the fixed-point data is loaded into the cache memory by the prefetch, while to load directly the floating-point data is directly loaded into the register by the preload. However, in the above-mentioned article by Sawamoto et al., it is not described at all to use the two methods, i.e., the prefetch and the preload appropriately for the floating-point data within one loop.

With respect to the prefetching, there has been studied the method wherein it is analyzed whether or not the prefetch is necessary for each of the memory accesses to delete any of the redundant prefetch instructions. This method is described in the above-mentioned article by Mowry et al. This method is based on the reuse analysis of the loop nest. In this connection, it is said that when the data in the same cache line is; referred to equal to or larger than two times, there is the reuse. The reuses are usually classified into the self-reuse wherein the same cache line among the different loop iterations is accessed on the basis of one reference, and the group reuse among a plurality of references. In the reuse analysis, the subscript expression of an array is expressed in the form of the linear expression of the loop control variables to carry the analysis thereof. The method of the reuse analysis is described in detail in an article of M. E. Wolf and M. S. Lam: "A Data Locality Optimizing Algorithm, Programming Language Design and Implementation", pp. 30 to 44, 1991. In the deletion of any of the redundant prefetch instructions, attention is paid to the group reuse. It is assumed that of a plurality of references having the group reuse, the reference with which new data are initially preferred to is the leading reference. Since the prefetch is applied to the leading reference, and with respect to other data, the data are utilized which have been written to the cache memory by the prefetch, the prefetch is omitted for other data. In such a way, the prefetch instruction is issued to only the necessary data.

The optimization of carrying out the reuse analysis between the loops to delete any of the redundant prefetches is described in an article of Keith Cooper et al.: "Cross-loop Reuse Analysis and its Application to Cache Optimizations, Workshop on Languages and Compilers for Parallel Computing", pp. 1 to 15, 1996. In accordance with this article, the reference parts of the array within each of the loops are obtained to propagate the reference parts thus obtained in the form of data flow, thereby obtaining the data sets which have arrived at the loop entry and the loop exit, respectively. For the data which have arrived at both of the loop entry and the loop exit, the prefetch is made unnecessary to be deleted.

As described above, each of the prefetch and the preload has both of the advantage and the disadvantage. As in the past, in the method of prefetching all of the data or preloading all of the data, the disadvantage thereof appears. Then, the more suitable method is selected between the prefetch and the preload in accordance with the characteristics of the memory references to generate the code in which both of the prefetch and the preload are used together with each other, whereby it is possible to utilize the advantages of both of the methods.

An object of the present invention is to provide an optimizing method wherein for a memory reference to which both of two methods, i.e., preload and prefetch can be applied, an access method which is more suitable for that reference is selected to generate a code in which both of the preload and the prefetch are used together with each other, thereby generating a code having higher execution performance.

DISCLOSURE OF INVENTION

The object of the present invention is attained by providing: a memory access method judgement step of determining which access method of prefetch, preload or load is selected for each of memory references; a preload optimization step of carrying out the optimization for the memory access which has been judged to be the preload to generate a preload code; and a prefetch optimization step of generating a prefetch code for the memory access which has been judged to be the prefetch.

A first method of the memory access method judgement step includes: a step of analyzing whether or not the description of a source program or the designation of a memory access method by a compiler option is present for the memory access; and a step of determining the memory access method in accordance with the analysis result.

A second method of the memory access method judgement step includes: a step of judging whether or not data have already been present on a cache memory; a step of judging the competition of those data with other data for cache; a step of judging whether or not the data will be referred to later again; and a step of judging whether or not the restriction on register resources is fulfilled. The step of judging whether or not data have already been present on a cache memory and the step of judging whether or not the data will be referred to later again include the analysis relating to the intraloop and the analysis relating to the interloop, respectively.

BRIEF DESCRIPTION OF DRAWINGS

FIG. 3 is a diagram showing one example of a source program to which an instruction for a memory access method is added;

FIG. 4 is a diagram showing one example of an instruction for a memory access method by a compiler option;

FIG. 6 is a diagram showing one example of a loop table;

FIG. 7 is a diagram showing one example of an access method registration table;

FIG. 17 is a diagram showing a loop table;

FIG. 20 is a diagram showing one example of a reuse registration table;

FIG. 27 is a diagram showing one example of a source program; and

FIG. 28 is a diagram showing another example of a source program.

BEST MODE FOR CARRYING OUT THE INVENTION

Embodiments according to the present invention will hereinafter be described with reference to the accompanying drawings.

A first embodiment according to the present invention is the memory access optimization based on the judgement for a memory access method in accordance with an instruction issued from a user.

Figure 1:
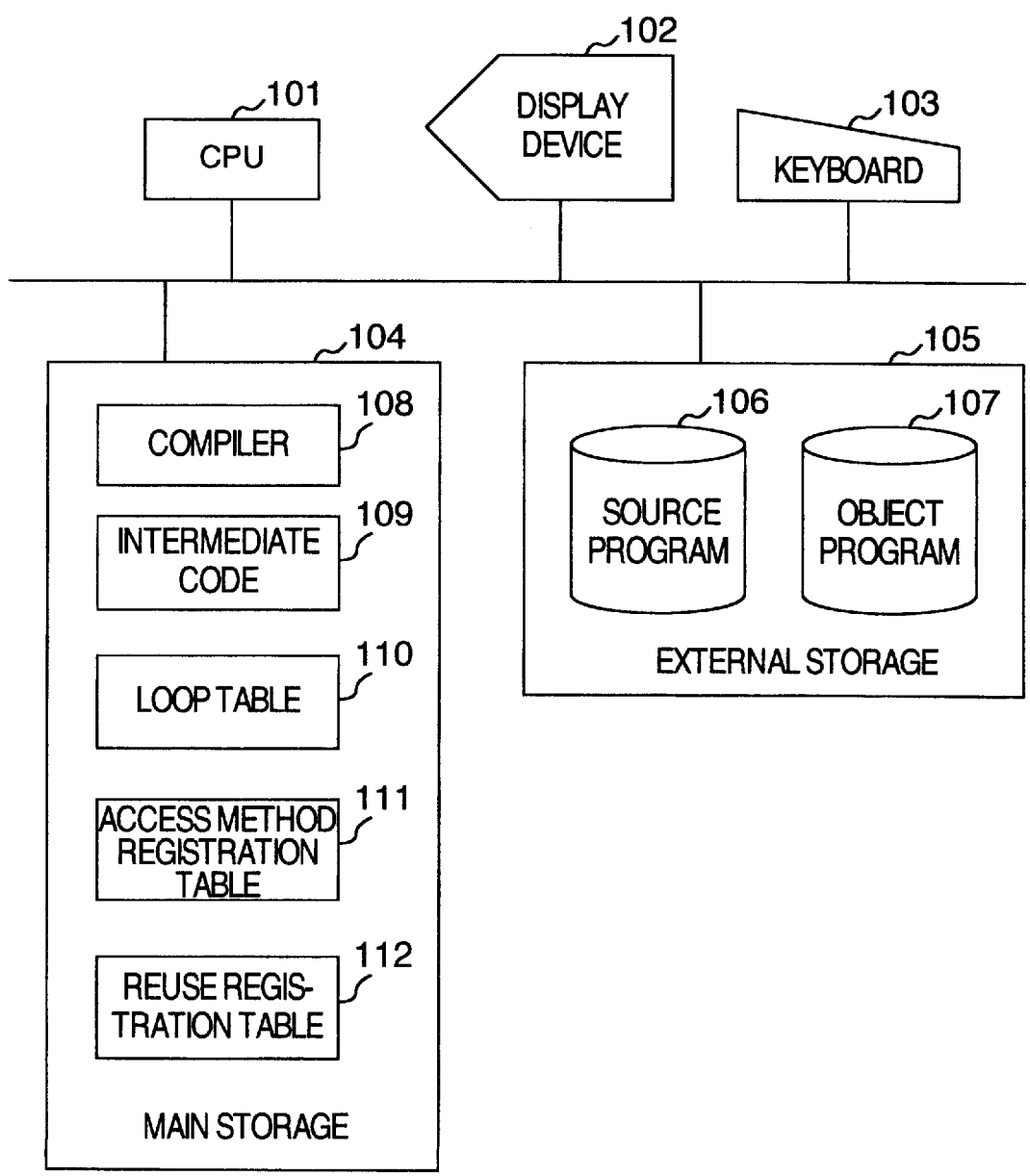
FIG. 1 is a block diagram showing a configuration of a system in which a compiler employing a memory access optimizing method according to the present invention is operated.

FIG. 1 is a block diagram showing a configuration of a computer system in which a compiler is operated to which a memory access optimizing method according to the present invention is applied. This computer system is constituted by a CPU 101, a display device 102, a keyboard 103, a main storage device 104, and an external storage device 105. A compiler activation instruction issued from a user is accepted through the keyboard 103. A compiler end message and an error message are displayed on the display device 102. A source program 106 and an object program 107 are stored in the external storage device 105. A compiler 108 and an intermediate language 109, a loop table 110 and an access method registration table 111, which are required in the compiling process, are all stored in the main storage device 104. A reuse registration table 112 is utilized in a second embodiment and is not utilized in the present embodiment. The compiling processing is controlled and executed by the CPU 101.

Figure 2:
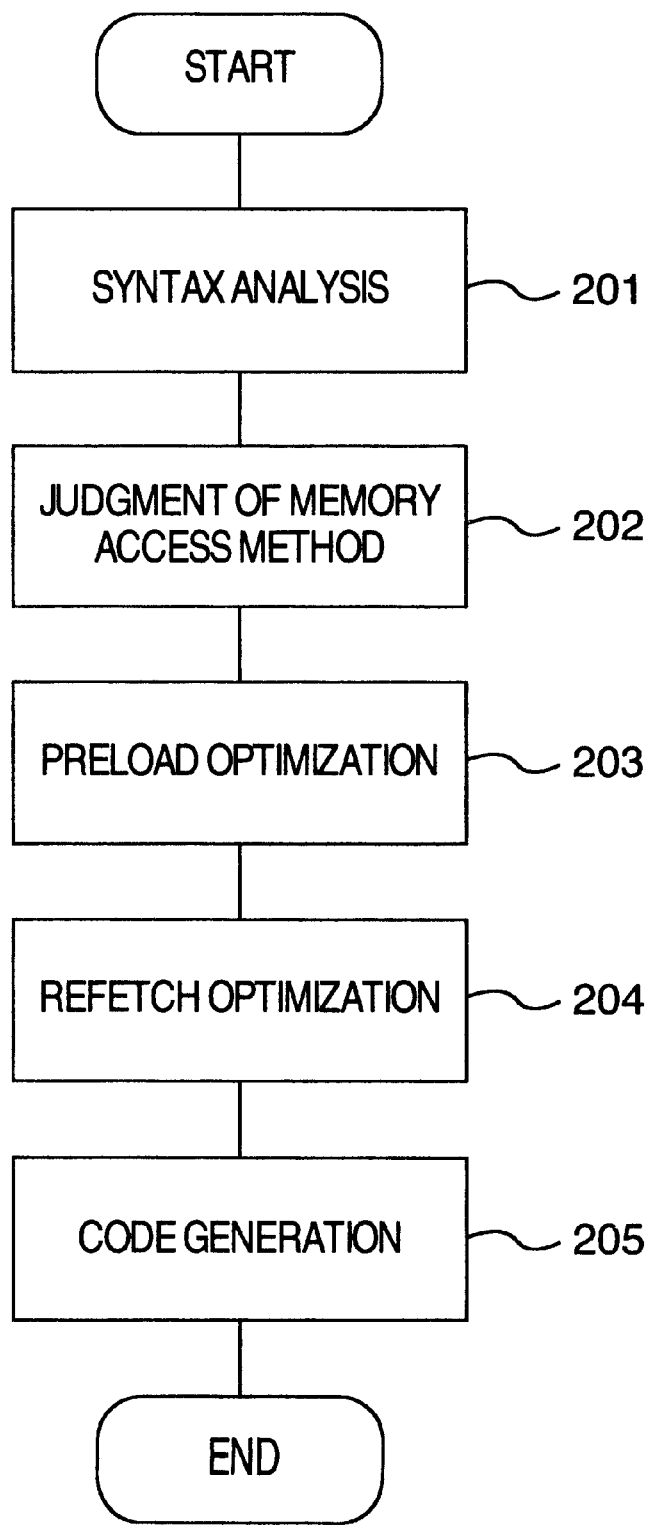
FIG. 2 is a flow chart useful in explaining the processing procedure in a compiler employing a memory access optimizing method according to the present invention.

FIG. 2 shows the processing procedure in the compiler 108 which is operated in the system shown in FIG. 1.

The processings in the compiler are executed in order of syntax analysis 201, judgement 202 of a memory access method, preload optimization 203, prefetch optimization 204, and generation 205 of a code.

In the syntax analysis 201, the syntax analysis and the loop analysis are carried out with the source program 106 as an input to output an intermediate code 109 and a loop table 110. The processing of the syntax analysis and the processing of the loop analysis are described in an article of "Compilers", by Aho, Sethi, Ullman, Science Company, 1990 for example. The intermediate code and the loop table will be described later.

In the judgement 202 of a memory access method, an access method to be applied is judged for every memory access, and the judgement result thereof is registered in an access method registration table 110. This judgement 202 of a memory access method is the part which becomes the feature of the present invention, and hence will be described in detail later.

In the preload optimization 203, an instruction scheduling optimization is carried out using the technique of the software pipelining for the memory access which has been judged to be the preload in the judgement 202 of an access method to generate a preload code. In the prefetch optimization 204, the optimization to generate a prefetch code is carried out for the memory access which has been judged to be the prefetch in the judgement 202 for an access method. In this connection, the preload optimization and the prefetch optimization will be described later with reference to FIGS. 10 to 15.

In the generation 205 of a code, the intermediate code 109 is converted into the object program 107 which is in turn outputted.

An example of the source program to which an instruction of an access method is added is shown in FIG. 3. In the figure, an instruction statement 301 is a prefetch instruction, and a name of an array to be prefetched or an element of an array to be prefetched is marked off by a comma to carry out the designation. The instruction statement is effective for the memory access within a loop nest right after the instruction statement of interest. An instruction statement 302 is a preload instruction.

A user instruction may also be designated by a user using a compiler option when activating the compiler. FIG. 4 shows an example of a user designation made by using the compiler option. In the figure, an option 401 is a prefetch instruction option and has the same meaning as that of the instruction statement 301. An subject loop, a name of an array or an element of an array can be designated to the option. An subject loop "loop1" represents the first loop nest within the program. An option 402 is a preload instruction statement.

Figure 5:
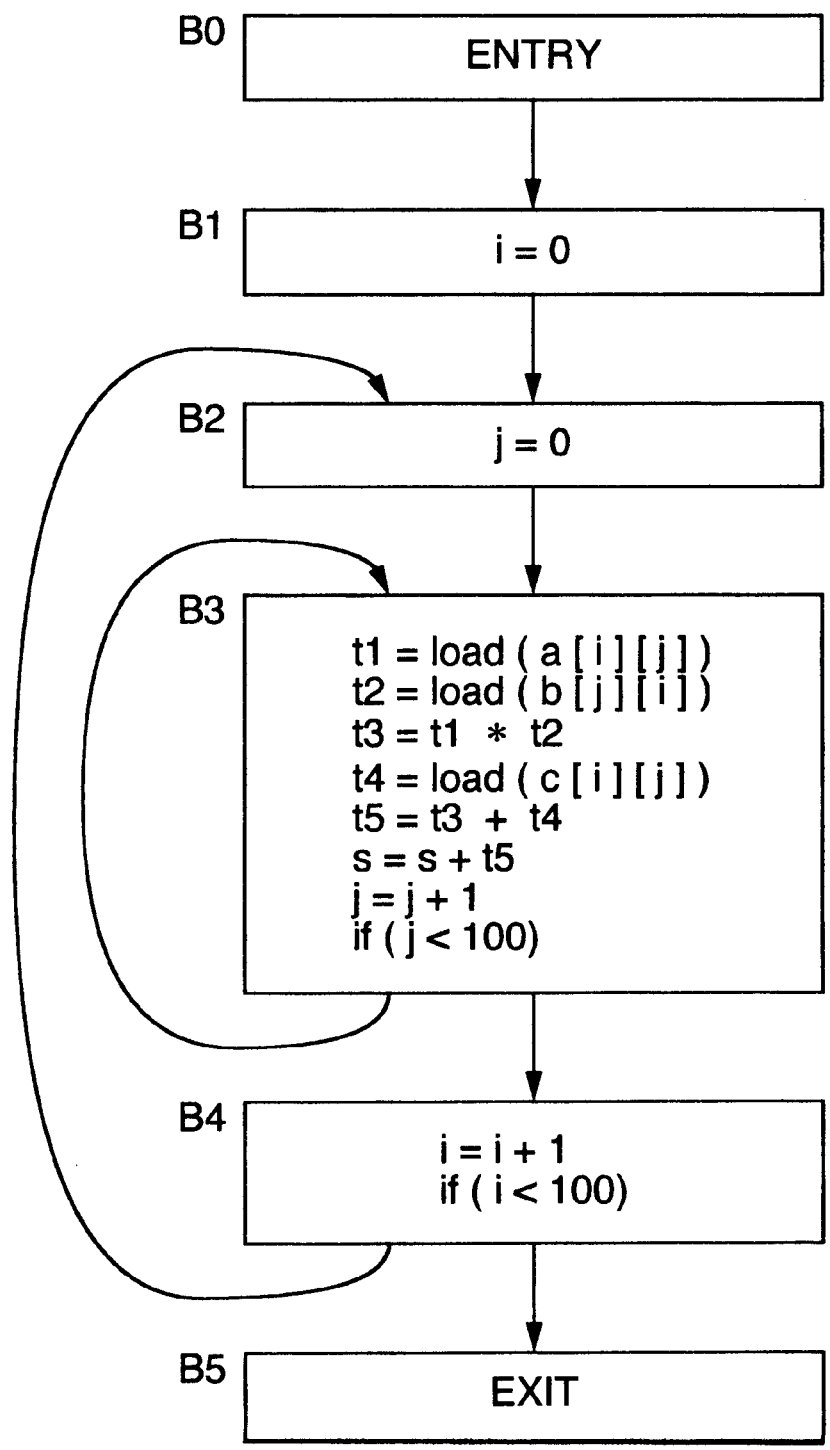
FIG. 5 is a diagram showing one example of an intermediate language for the program shown in FIG. 3.

FIG. 5 shows an example of the intermediate code of the compiler in the present embodiment which corresponds in turn to the source program shown in FIG. 3. The intermediate code is produced in the syntax analysis 201. The intermediate code is expressed in the form of a graph in which the basic blocks are linked with the edges thereof. Such a graph is called a control flow graph. Reference symbols B0 to B5 designate the basic blocks, respectively. Each of the basic blocks is constituted by a plurality of statements. Each of the statements corresponds roughly to the executable instruction and hence may be called "the instruction" in some cases. The expression of "t1=load(a[i][j])" means that the value of a[i][j] is loaded to be substituted for a temporary variable t1. The memory access which becomes a subject of the optimization in the present embodiment is expressed in the form of "load".

FIG. 6 shows an example of a loop table in the present embodiment. This loop table is produced in the syntax analysis 201. In the figure, reference numeral 601 designates a loop number, and reference numeral 602 designates a basic block which belongs to the associated of the loops. A user instruction which is applied to the associated one of the loops is registered in a prefetch instruction statement 603 and a preload instruction statement 604.

The loop table shown in FIG. 6 corresponds to the source program shown in FIG. 3 and the intermediate code shown in FIG. 5. A loop number 1 represents the inner loop and a loop number 2 represents the outer loop. The prefetch instruction statement and the preload instruction statement are registered in such a way as to correspond to the loop of the loop number 1 as the inner loop.

An example of a table in which access methods are registered is shown in FIG. 7. This access method registration table has the fields of a loop number 701 exhibiting the loop to which a memory access belongs, a memory access 702, and an access method 703. These fields are set in the step of the judgement 202 of a memory access method, and in the steps of the preload optimization 203 and the prefetch optimization 204, the processings conformed to the associated ones of the registered access methods are executed.

Next, the processing procedure for the judgement 202 of an access method will hereinbelow be described in detail.

Figure 8:
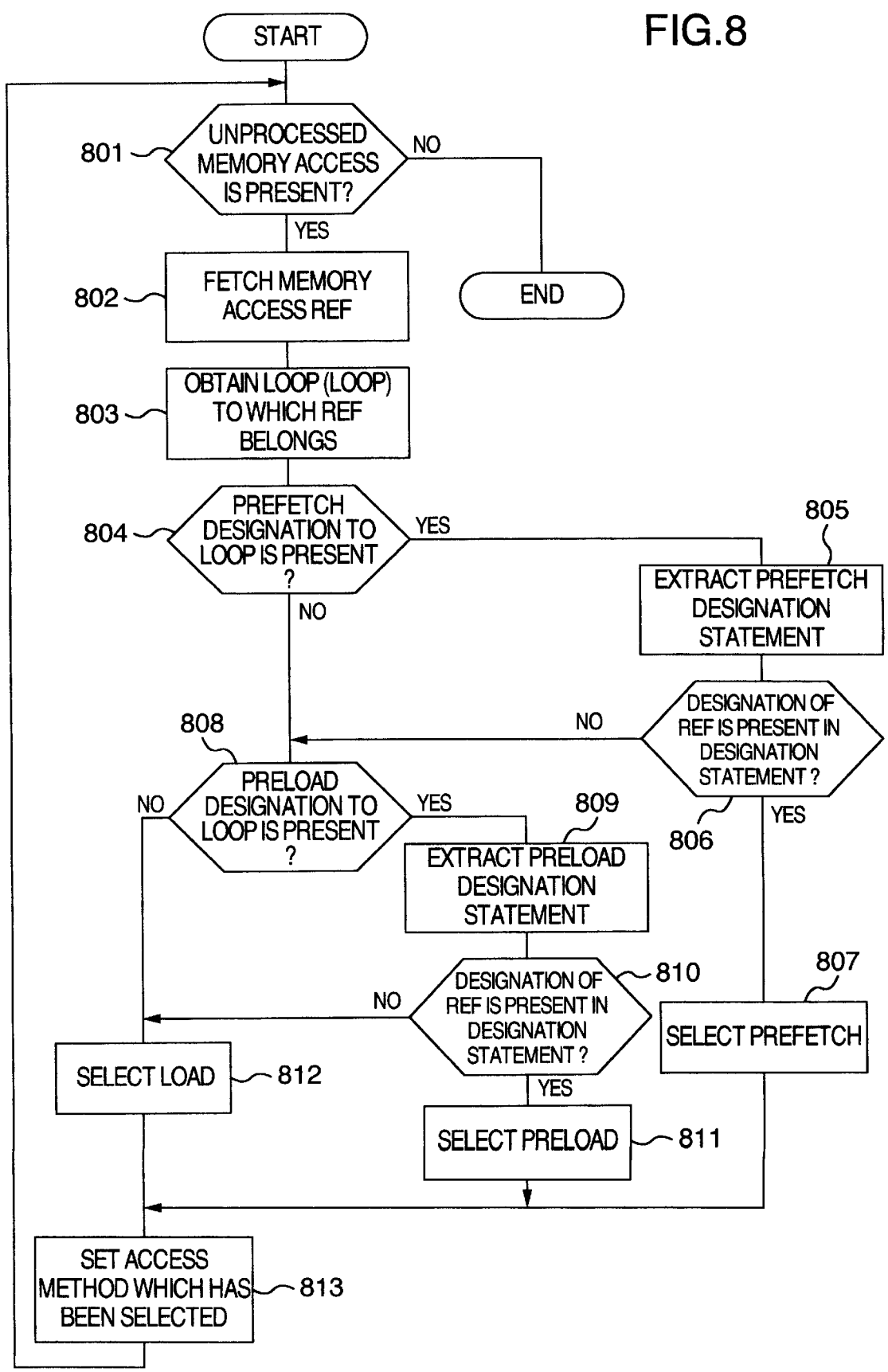
FIG. 8 is a flow chart useful in explaining the processing procedure of memory access method judgement in a memory access optimizing method according to the present invention.

FIG. 8 shows a flow chart useful in explaining the processing procedure, for the judgement of an access method, which is carried out in accordance with an instruction issued by a user. The processing steps will hereinbelow be described.

In Step 801, it is judged whether or not some of unprocessed memory accesses are present on an intermediate code. If it is judged in Step 801 that any of unprocessed memory accesses is absent on the intermediate code, then the processing is completed. On the other hand, if it is judged in Step 801 that some of unprocessed memory accesses are present on the intermediate code, then the processing proceeds to Step 802 in which the unprocessed memory access is in turn fetched to be made REF. In Step 803, a loop to which REF belongs is obtained to be made LOOP. The loop to which the associated one of the references belongs is obtained by obtaining the basic block to which the associated one of the references belongs from the intermediate code and searching for the basic block in the loop table 110.

In Step 804, reference is made to the loop table 110 to check whether or not the statement having the prefetch designation to LOOP is registered. If it is checked in Step 804 that the statement having the prefetch designation to LOOP is registered, then the processing proceeds to Step 805 in which the prefetch designation statement is in turn extracted. Then, it is judged in Step 806 whether or not the designation of REF is present in the prefetch designation statement. The details of Step 806 will be described later with reference to FIG. 9. If it is judged in Step 806 that the designation of REF is present in the prefetch designation statement, then the processing proceeds to Step 807 in which the prefetch is selected as an access method.

On the other hand, if it is checked in Step 804 that the statement having the prefetch designation to LOOP is not registered, then the processing proceeds to Step 808 in which it is checked in turn whether or not the preload designation to LOOP is present. If it is checked in Step 808 that the preload designation to LOOP is present, then the preload designation statement is extracted in Step 809. Then, it is checked in Step 810 whether or not the designation of REF is present in the preload designation statement. The details of the. processing in Step 810 will be described later with reference to FIG. 9. If it is checked in Step 810 that the designation of REF is present in the preload designation statement, then the processing proceeds to Step 811 in which the preload is in turn selected.

On the other hand, if it is checked in Step 810 that the designation of REF is absent in the preload designation statement, then the processing proceeds to Step 812 in which the load is in turn selected.

In Step 813, the access method which has been selected is registered in the access method registration table.

Figure 9:
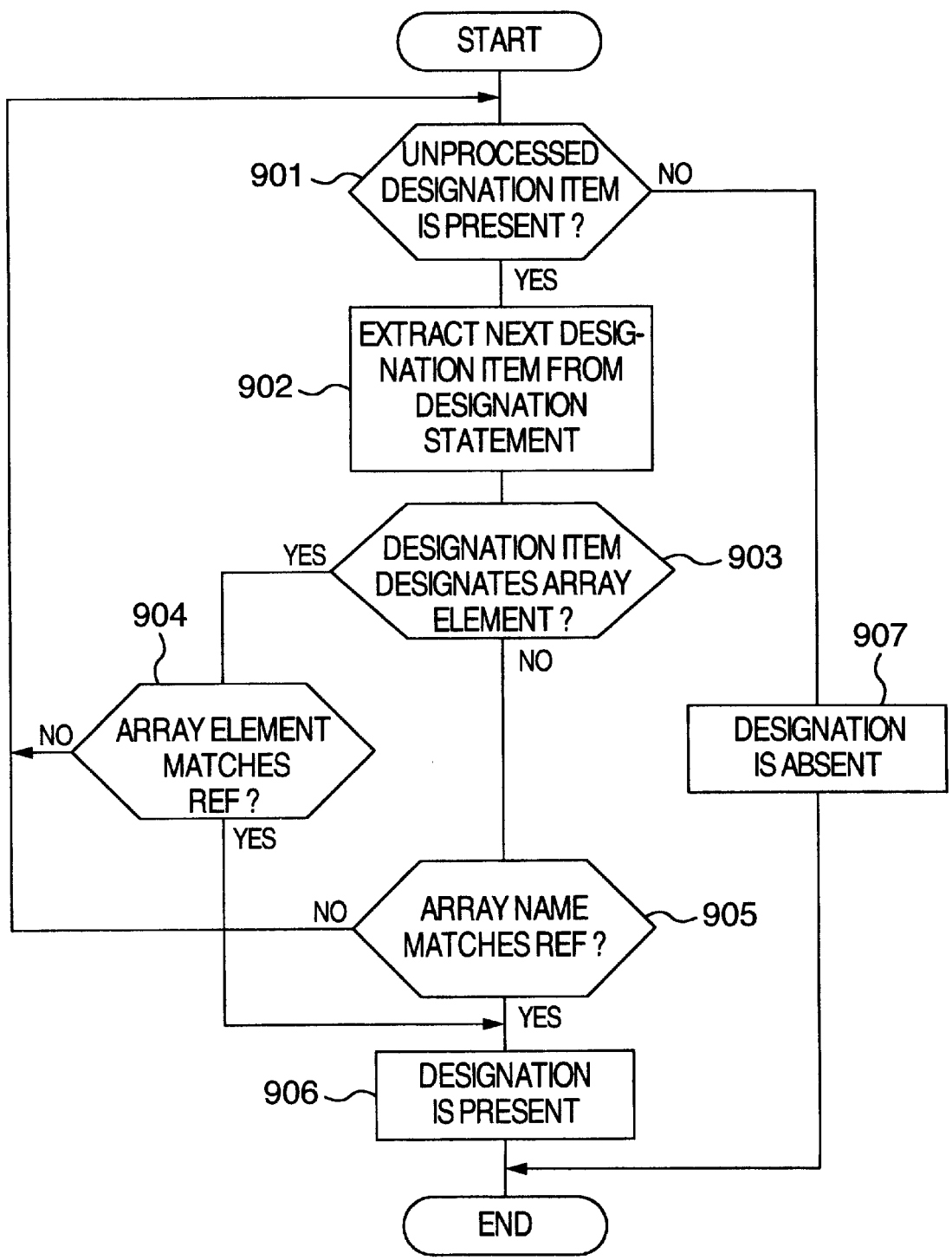
FIG. 9 is a flow chart useful in explaining the processing procedure of analyzing the presence or absence of a designation in a designated statement of a certain memory access in memory access method judgement according to the present invention.

FIG. 9 shows the details of the processing procedure of checking in Steps 806 and 810 whether or not the designation of REF is present in the designation statement. The processings in Steps of FIG. 9 will hereinbelow be described.

In Step 901, it is judged whether or not some of the unprocessed designation items are present in the designation statement. If it is judged in Step 901 that any of the unprocessed designated items is absent in the designation statement, then the processing proceeds to Step 907 in which it is judged in turn that the designation of REF is absent, and then the processing is completed. On the other hand, if it is judged in Step 907 that some of the unprocessed designation items are present in the designation statement, then the processing proceeds to Step 902 in which a next designation item is in turn extracted from the designation statement. The designation item designates either a name of an array or an array reference.

It is checked in Step 903 whether or not the designation item designates an element of an array. If it is checked in Step 903 that the designation item designates an element of an array, then the processing proceeds to Step 904 in which it is checked in turn whether or not the element of an array matches REF. If it is checked in Step 904 that the element of an array matches REF, then the processing proceeds to Step 906 in which it is judged in turn that the designation of REF is present, and then the processing is completed. On the other hand if it is checked in Step 904 that the element of an array does not match REF, then the processing is returned back to Step 901 to proceed to the processing for a next designation item.

On the other hand, if it is judged in Step 903 that the designation item does not designate the element of an array, then the processing proceeds to Step 905. In this case, since the designation item designates the name of an array, then it is checked whether or not the name of an array matches that of an array of REF. If it is checked that the name of an array matches that of an array of REF, then the processing proceeds to Step 906 in which it is judged in turn that the designation of REF is present, and then the processing is completed. On the other hand, if it is checked that the name of an array does not match that of an array of REF, then the processing is returned back to Step 901.

Above, the description of the processing procedure for the judgement 202 of a memory access method in the first embodiment has been completed.

Next, the processing of judging an access method for the program shown in FIG. 3 will hereinbelow be described in accordance with the processing procedure shown in FIGS. 8 and 9.

The processing proceeds to Step 801, Step 802 and Step 893 in this order to extract a memory access a[i] [j] in the basic block B3, and the loop1. Then, the processing proceeds to Step 804 and Step 805 to fetch a prefetch designation "a, c[i] [j]" to the loop1. It is judged in Step 806 in accordance with the processing procedure of FIG. 9 whether or not the designation of a[i] [j] is present in the designation statement.

Then, the processing proceeds to Step 901 and Step 902 to extract a first designation item "a" of the prefetch designation. This designation item designates a name of an array. Since it is judged in Step 903 that the designation item does not designate an element of an array, the processing proceeds to Step 905. In Step 905, a name "a" of an array in REF "a[i] [j]" is compared with a designation item "a". In this case, since the name "a" of an array matches the designation item "a", the processing proceeds to Step 906 in which it is judged in turn that the designation is present, and then the processing is completed.

Since it is judged in Step 806 that the designation is present, the processing proceeds to Step 807 and Step 813 to register "loop1, a[i] [j], prefetch" in the access method registration table.

Next, the processing is returned back to Step 801 in which a next memory access "b[j] [i]" is in turn checked. In Step 805, the prefetch designation "a, c[i] [j]" of the loop1 is extracted to check whether or not the designation of b[j] [i] is present in the prefetch designation "a, c[i] [j]" of the loop1. In this case, since the designation of b[j] [i] is absent therein, the processing proceeds to Step 808 and Step 809 to extract the preload designation "b". In Step 810, it is judged that the designation is present. Then, the processing proceeds to Step 811 and Step 813 to register "loop1, b[j] [i], preload" in the access method registration table.

Next, the processing is returned back to Step 801 to check a next memory access "c[i] [j]". In Step 805, the prefetch designation "a, c[i] [j]" of the loop1 is extracted, and then in Step 806, the judgement is carried out in accordance with the processing procedure of FIG. 9.

In Step 901 and Step 902, the first designation item "a" is extracted. Since this designation item designates a name of an array, the processing proceeds to Step 905. However, since the name of an array of REF does not match the name of an array of "c[i] [j]", the processing is returned back to Step 901. Next, a second designation item "c[i] [j]" is extracted. Since this designation item designates an element of an array, the processing proceeds from Step 903 to Step 904. In this case, since an element of an array matches REF, the processing proceeds to Step 906 in which it is judged in turn that the designation is present.

Since it is judged in Step 806 that the designation is present, the processing proceeds to Step 807 and Step 813 to register "loop1, c[i] [j], prefetch" in the access method registration table.

Next, the description will hereinbelow be given with respect to the preload optimization of Step 203.

Figure 10:
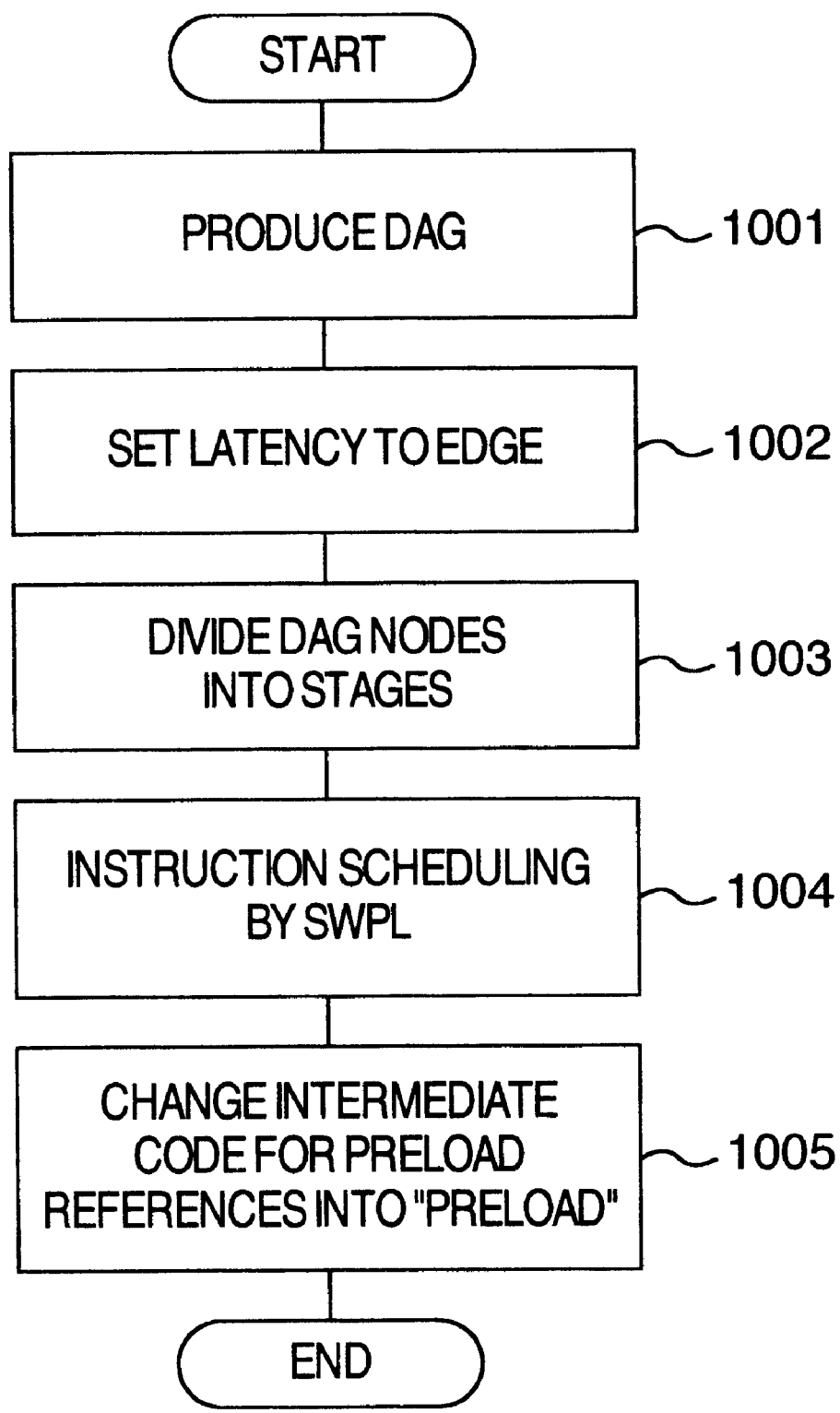
FIG. 10 is a flow chart useful in explaining the processing procedure of preload optimization in a memory access optimizing method according to the present invention.

In the preload optimization, the processing is executed in loops for the most innermost loop. In the preload optimization, the processings which are basically conformed to the technique of the software pipelining are executed. The software pipelining, for example, is described in an article of M. Lam: "Software Pipelining: An Effective Scheduling Technique for VLIW Machines", Proc. Of the SIGPLAN '88 Conference on Programming Language Design and Implementation, pp. 318 to 328, 1988. FIG. 10 shows the processing procedure for the preload optimization for one loop. The processings of Steps in FIG. 10 will hereinbelow be successively described while taking as an example the processing for the intermediate code shown in FIG. 5.

Figure 11:
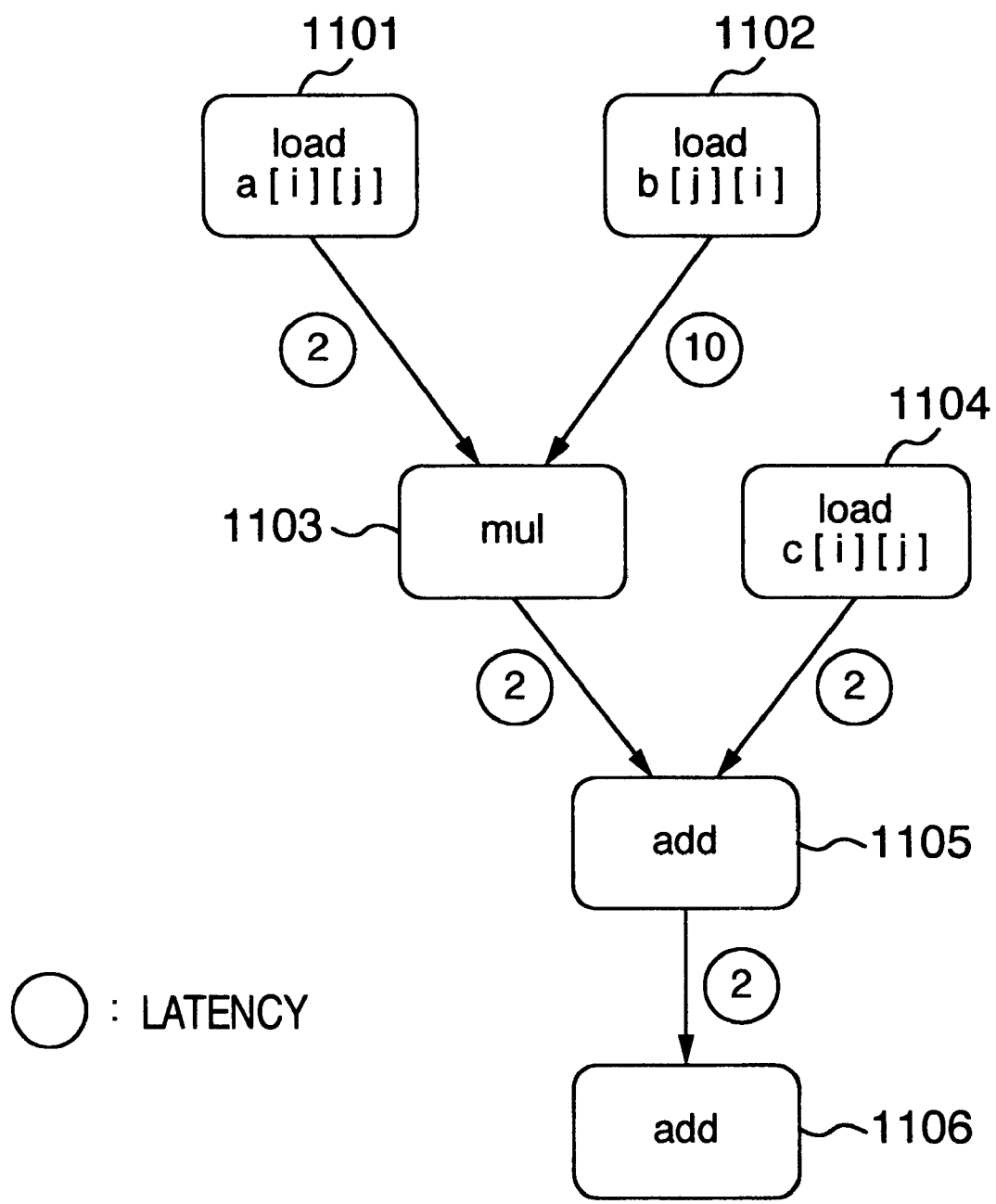
FIG. 11 is a diagram showing one example of a DAG corresponding to a basic block B3 of the intermediate language shown in FIG. 5.

In Step 1001, a DAG (directed acyclic graph) is produced. An example of the DAG is shown in FIG. 11. This example corresponds to the basic block B3 of the intermediate code shown in FIG. 5. The nodes of the DAG correspond to the statements in the basic blocks, respectively. The edge between the nodes represents the restriction on the execution sequence. For example, in the arithmetic mul of a node 1103, the result of load in a node 1101 and a node 1102 is made the operand, and hence the node 1101 and the node 1102 must be executed prior to the node 1103. This relation is expressed in the form of the edge extending from the node 1101 to the node 1103 and the edge extending from the node 1102 to the node 1103.

Figure 12:
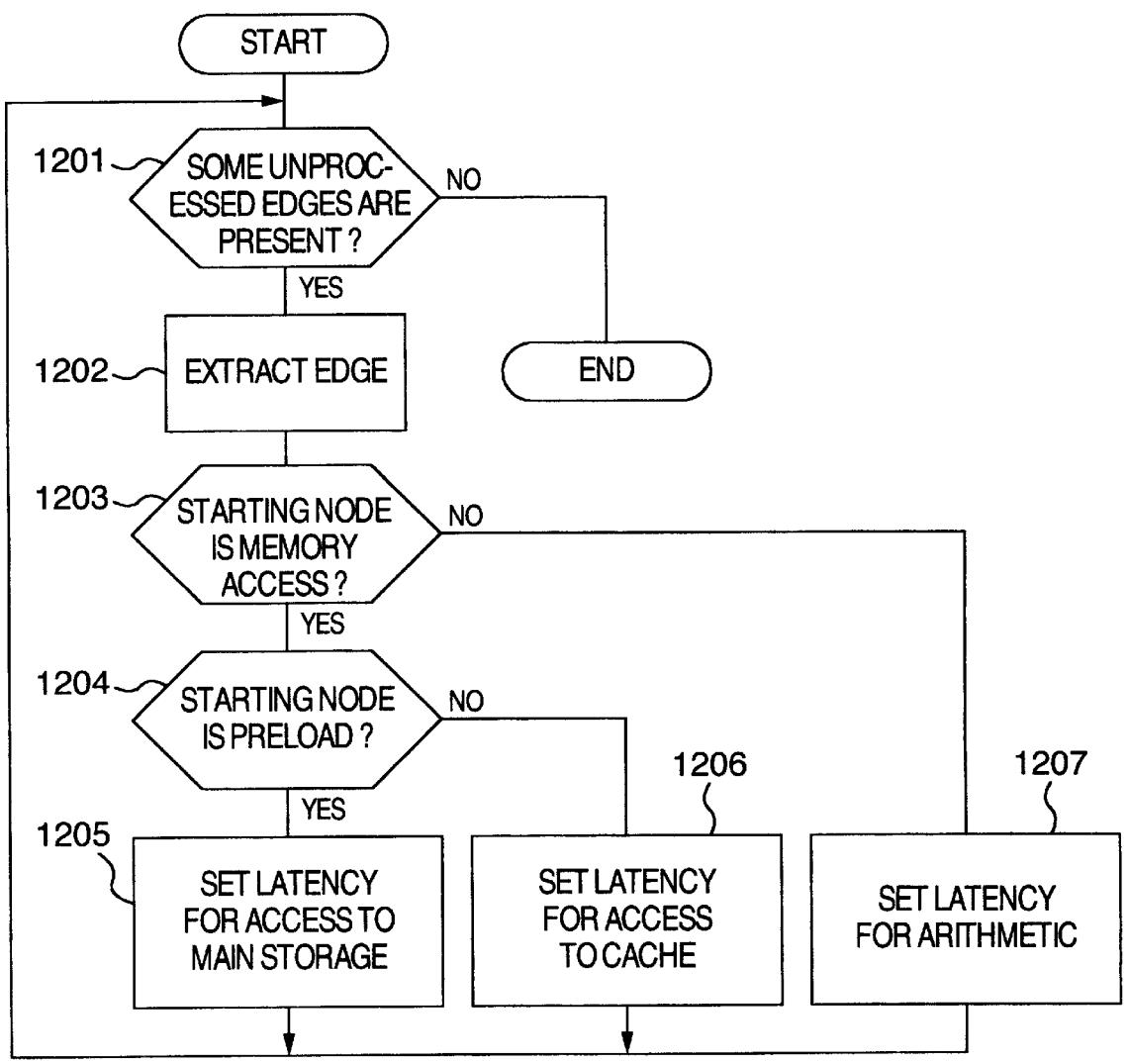
FIG. 12 is a flow chart useful in explaining the processing procedure of setting a latency onto a DAG edge in the preload optimization according to the present invention.

In Step 1002, the latency is set on the edge of the DAG which has been produced in Step 1001. The details of the processing procedure in the present Step are shown in FIG. 12 in the form of a flow chart. The processings of Steps in FIG. 12 will hereinbelow be described.

The present processing traces the edges on the DAG which are in turn successively processed. It is judged in Step 1201 whether or not some of the unprocessed edges are present. If it is judged in Step 1201 that the any of the unprocessed edges is absent, then the processing is completed. On the other hand, if it is judged in Step 1201 that some of the unprocessed edges are present, then the processing proceeds to Step 1202 in which the unprocessed edge is in turn extracted to be made the processing subject.

In Step 1203, it is checked whether or not the starting node of the edge is the memory access. If it is checked in Step 1203 that the starting node of the edge is not the memory access, then the processing proceeds to Step 1207 in which the value of the latency corresponding to the arithmetic for the starting node is set on the edge, and then the processing is completed for this edge. Then, the processing is returned back to Step 1201. On the other hand, if it is checked in Step 1203 that the starting node of the edge is the memory access, then the processing proceeds to Step 1204.

In Step 1204, the access method of the memory access for the starting node is checked on the basis of the access method registration table 111. If it is checked in Step 1204 that the access method is the preload, then the processing proceeds to Step 1205 to set the latency required for the access to the main storage device. On the other hand, if it is checked in Step 1204 that the access method is not the preload, then the processing proceeds to Step 1206 to set the latency required for an access to the cache memory.

In the example of the intermediate code shown in FIG. 5, the latency is set in the manner as shown in FIG. 11. It is assumed that the latency required for the arithmetics mul and add is two cycles. In addition, since with respect to the memory accesses a[i] [j] and c[i] [j], the access method thereof is the prefetch, the latency required for the access to the cache memory is set. It is assumed that this value is two cycles. In addition, since with respect to the memory access b[j] [i], the access method thereof is the preload, ten cycles are set as the latency required for the access to the main storage device.

In Step 1003, the DAG nodes are divided into the stages of the software pipelining on the basis of the value of the latency which has been set. In the present example, since the latency of the edge with the DAG node 1102 as the starting point is so long as it has ten cycles, the node 1102 is made a first stage and each of other nodes is made a second stage.

In Step 1004, the intermediate code is changed in the instruction scheduling made by the software pipelining.

In Step 1005, the intermediate code for the preload references is changed into "preload".

Figure 13:
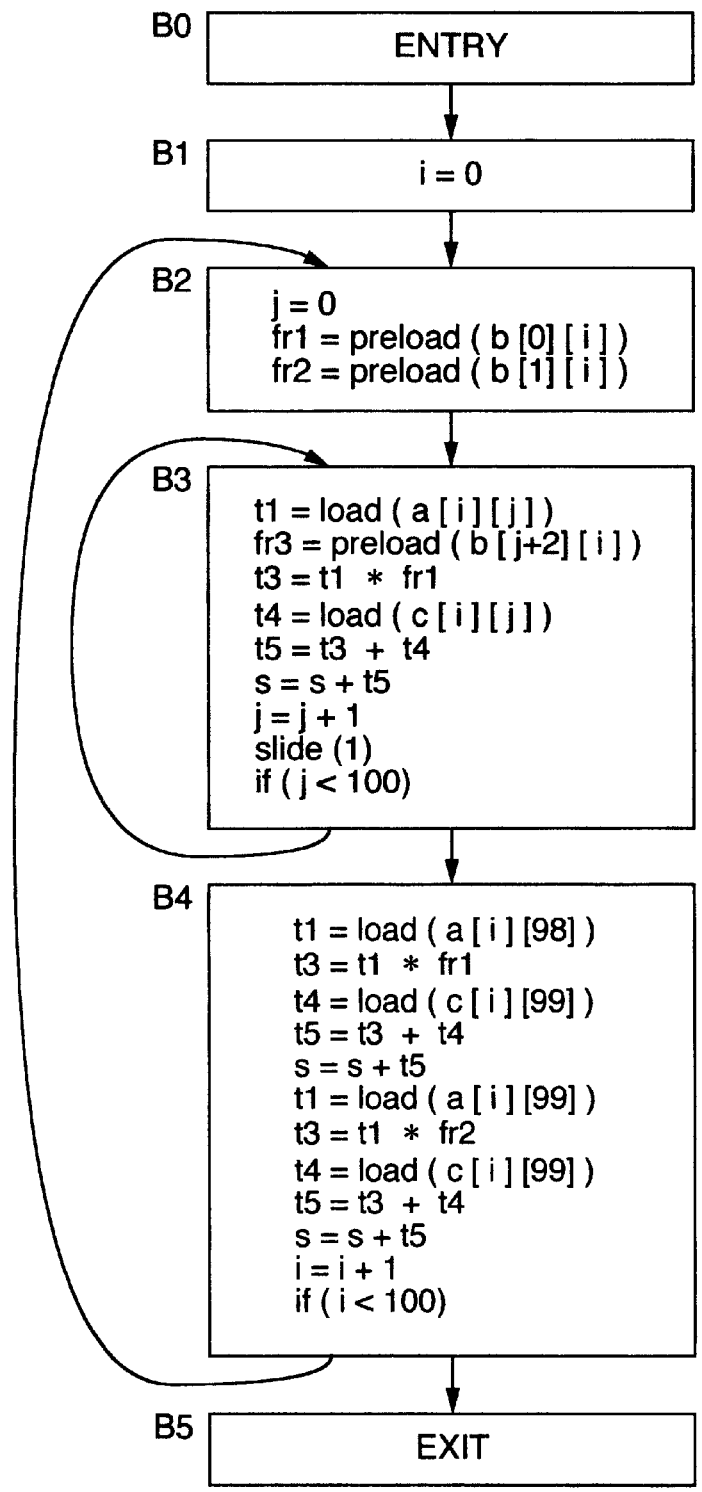
FIG. 13 is a diagram showing one example of an intermediate language which is obtained after having applied the preload optimization to the intermediate language shown in FIG. 5.

The result of applying the preload optimization to the intermediate code shown in FIG. 5 is shown in FIG. 13.

An instruction corresponding to the DAG node 1102 of the first stage is inserted as a prologue code into the basic block B2. The basic block B3 is a Kernel Code. An instruction corresponding to the second stage is inserted as an epilogue code into the basic block B4.

Each of three instructions to access an array b is changed into "preload".

In this example, there is shown the code in which the slide window mechanism is utilized. The slide window mechanism is described in an article of Sawatomo et al.: "Data Bus Technology of RISC-based Massively Parallel Supercomputer", Journal of IPSJ, Vol. 38, No. 6, pp. 485 to 492, 1997. In the basic block B3, an element of an array b which is used in two iterations after is preloaded. The expression of "slide(1)" in B3 means that a register window is slided one by one whenever an iteration has been carried out. Therefore, it is assumed that the arithmetic having b[i] [j] as an operand uses a register fr1. Then, the value is written to the register fr3, which is two registers beyond the register fr1, by the preload instruction.

Above, the description of the preload optimization 203 has been completed.

Next, the description will hereinbelow be given with respect to the prefetch optimization 204.

Figure 14:
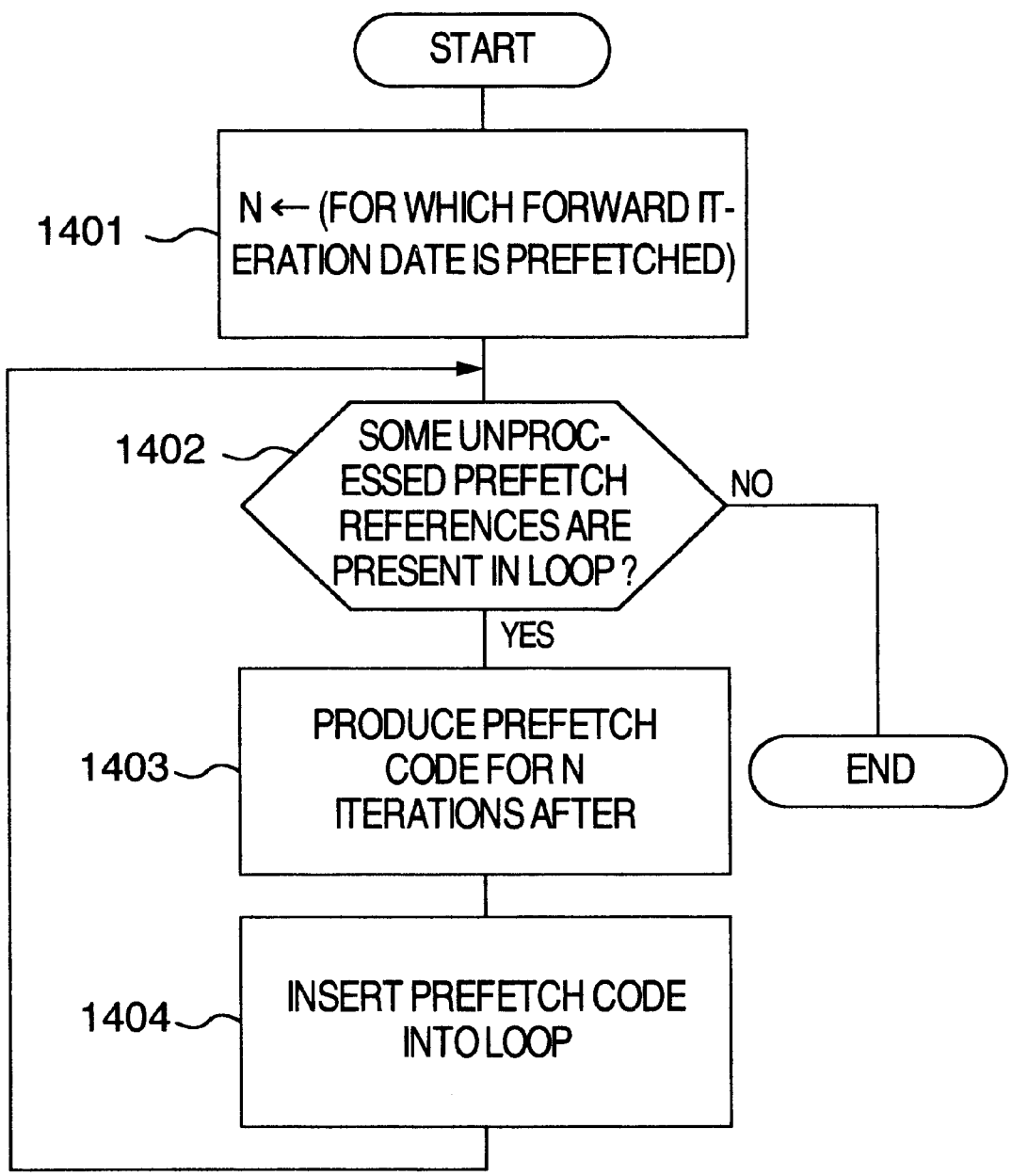
FIG. 14 is a flow chart useful in explaining the processing procedure of prefetch optimization in a memory access optimizing method according to the present invention.

The processing procedure for the prefetch optimization is shown in FIG. 14. The Steps of the processing procedure will hereinbelow be described.

In Step 1401, for which forward iteration the data is prefetched, and the resultant value (the gap between current iteration and prefetch object iteration) is made n. How this value is obtained is described in an article of Todd C. Mowry et al.: "Design and Evaluation of a Compiler Algorithm for Prefetching", ASPLOS V, pp. 62 to 73, 1992 for example.

In Step 1402, it is checked from the memory access method registration table 111 whether or not for the memory reference in the loop, the access method is the prefetch to extract the unprocessed prefetch reference. If any of the unprocessed prefetch references is absent, then the processing is completed.

In Step 1403, for the memory access which has been extracted, the prefetch code of the address to be accessed n iterations after is produced. In Step 1404, the prefetch code which has been produced in Step 1403 is inserted into the loop, and then the processing is returned back to Step 1402.

Figure 15:
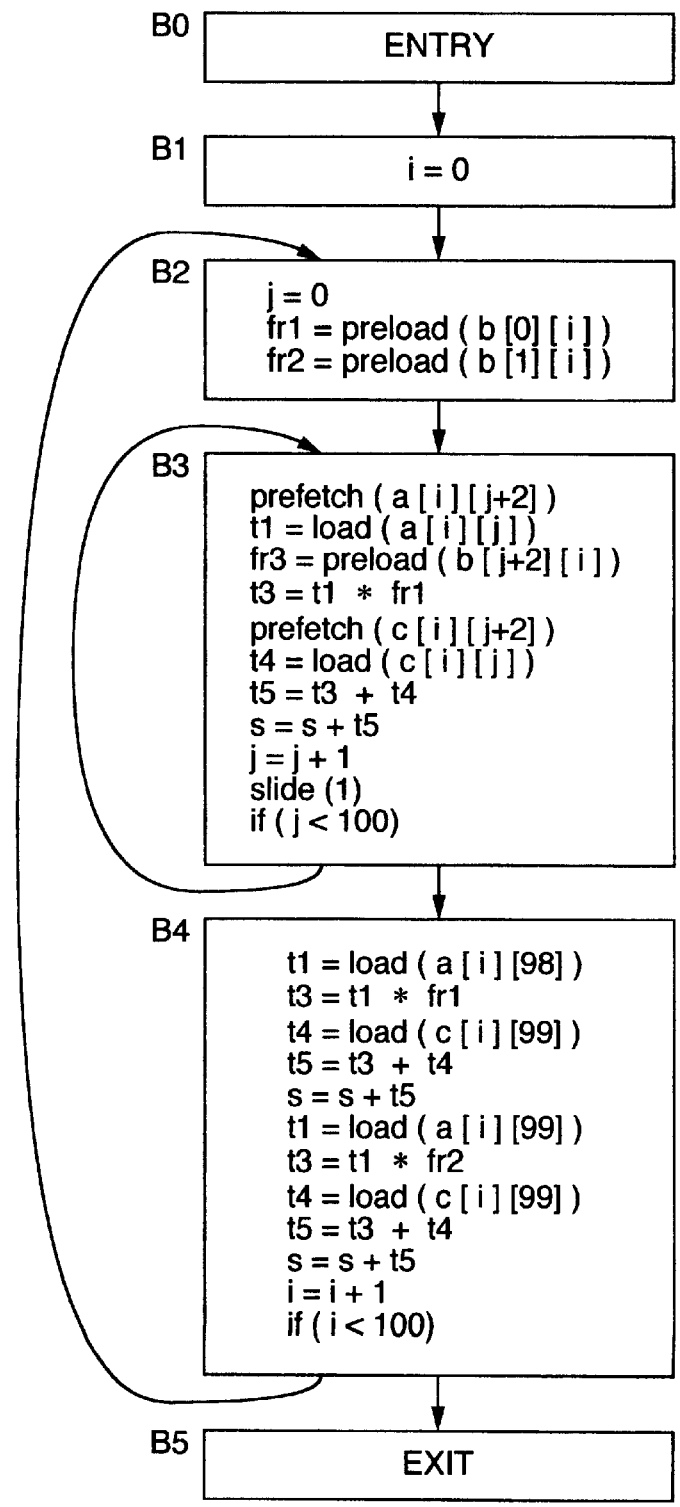
FIG. 15 is a diagram showing one example of an intermediate language which is obtained after having applied the prefetch optimization to the intermediate language shown in FIG. 13.

The result of applying the prefetch optimization to the intermediate code shown in FIG. 13 is shown in FIG. 15. In Step 1401, the value of n is set to 2. Since with respect to the memory access "a[i] [j]", the access method thereof is the prefetch, in Step 1403, "prefetch a[i] [j+2]" is produced as the prefetch code which will be obtained after carrying out two iterations. In Step 1404, this code is inserted into the intermediate code. In FIG. 15, this code is inserted into the statement right after load of a[i] [j]. With respect to the memory access "c[i] [j]" as well, likewise, the prefetch code is produced to be inserted thereinto.

Above, the description of the first embodiment according to the present invention has been completed.

Next, the judgement of an access method by the analysis of the compiler will hereinbelow be described as a second embodiment according to the present invention.

With respect to an example of the system in which the compiler shown in FIG. 1 is operated, the second embodiment is the same in configuration as the first embodiment.

The processing procedure in the compiler, similarly to the first embodiment, is conformed to the processing procedure of FIG. 2.

In Step 201, the syntax analysis is carried out to produce an intermediate code and a loop. The expression of the intermediate code is the same as that in the first embodiment. A loop table will be described later with reference to FIG. 17. The reuse registration table 112 is utilized in the judgement 202 of a memory access method. The reuse registration table 112 will be described later with reference to FIG. 20.

In Step 202, the intermediate language and the information of the loop table are analyzed to judge the memory access method to register the judgement result in the access method registration table. In this connection, the access method registration table is the same as that in the first embodiment and hence is as shown in FIG. 7. Since the processing procedure for the judgement of a memory access method is a part which becomes the feature of the present embodiment, it will be described in detail later.

In Step 203, there is carried out the preload optimization aimed at the memory access which is registered as the preload in the memory access method registration table. In Step 204, there is carried out the prefetch optimization aimed at the memory access which is registered as the prefetch. In Step 205, the generation of a code is carried out for the intermediate language for which the prefetch optimization and the preload optimization have been carried out to generate an object code. The processings in these Steps are the same as those in the first embodiment, and hence the description thereof is omitted for the sake of simplicity.

The judgement 202 of a memory access method in the present embodiment will hereinbelow be described in detail.

The judgement of a memory access method includes the analysis of the intraloop and the analysis of the interloop. While the description will hereinbelow be given with respect to the processing procedure of carrying out both of the analysis of the intraloop and the analysis of the interloop, it is also possible to carry out the judgement with one of them omitted.

Figure 16:
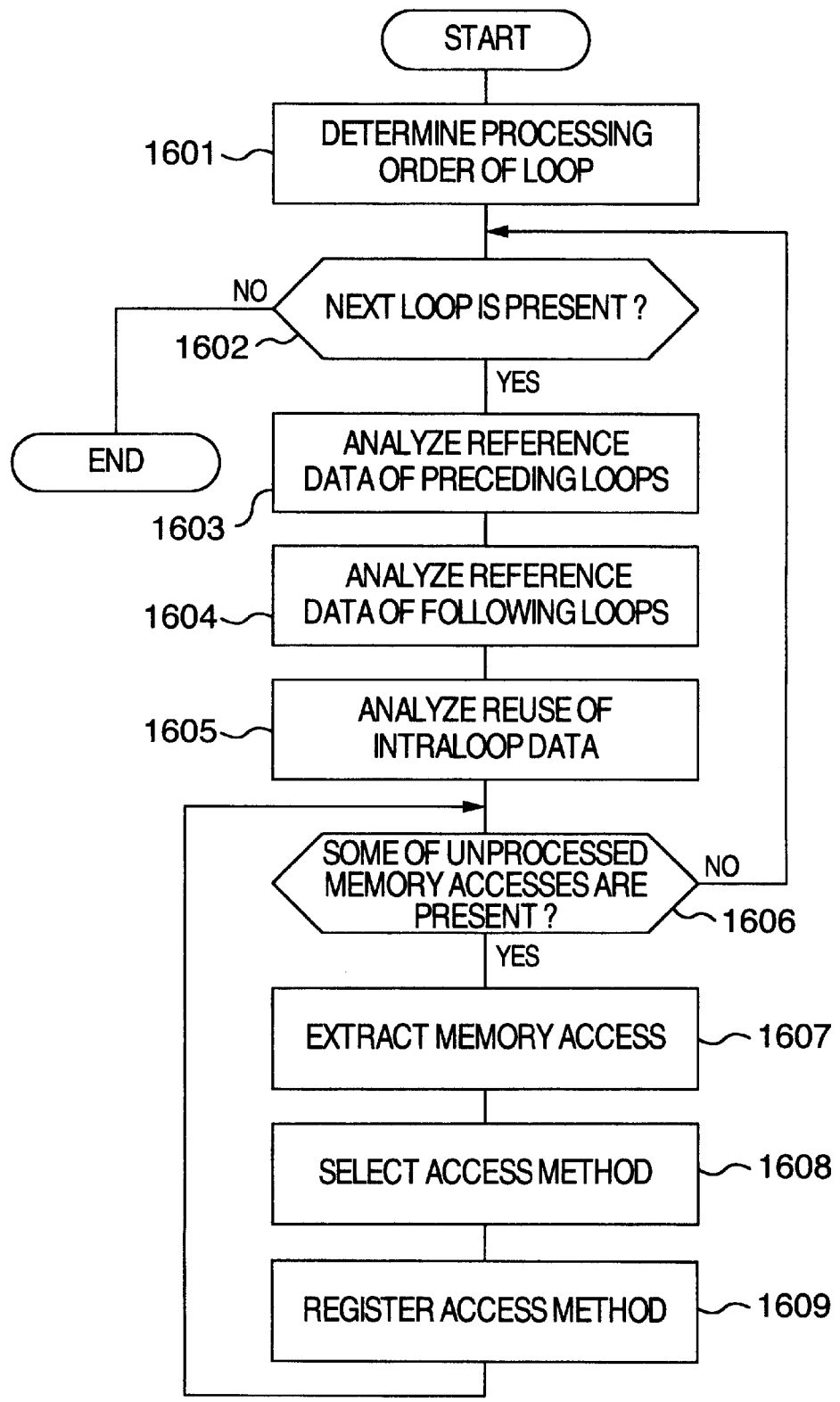
FIG. 16 is a flow chart useful in explaining the processing procedure of the memory access method judgement, which is made on the basis of the analysis by a compiler, in a memory access optimizing method according to the present invention.

FIG. 16 shows the processing procedure for the judgement of an access method in the present embodiment. The processings in steps will hereinbelow be described.

In Step 1601, the processing order of the loop is determined. The ordering is carried out in such a way that the loop is processed in the execution order as much as possible. The loop of the processing subject is made the innermost loop. The ordering result is registered in the loop table. The present Step relates to the analysis of the interloop. When only the analysis of the interloop is carried out, the ordering may be arbitrary.

The loop table is shown in FIG. 17. In the figure, reference numeral 1701 designates a loop number, and reference numeral 1702 designates a basic block which belongs to the associated one of the loops. In order that the loop to which the associated one of the memory accesses belongs may be checked up, the basic block to which the loop of interest belongs may be searched for. Reference numeral 1703 designates a preceding loop number set thereto, and reference numeral 1704 designates a next loop number set thereto. The results of ordering the loops are set in these fields, respectively. These fields are set for the innermost loop. Fields ranging from a field 1705 to a field 1708 are the information relating to loop control variables. These fields are utilized when analyzing the subscripts of an array in the reuse analysis or the like.

In Step 1602, the next processing loop is fetched in accordance with the processing order for the loops which has been determined in Step 1601. If the next loop is absent, then the processing is completed.

The processing in Step 1603 relates to the analysis of the interloop to analyze the reference data of the preceding loops. By the preceding loops is meant the loops which is executed before the current processing loop. If the processing order of the loops is the execution order, since for the preceding loops, the judgement of an access method has already been processed, there is carried out the analysis employing the access method of the reference in the preceding loops.

Figure 18:
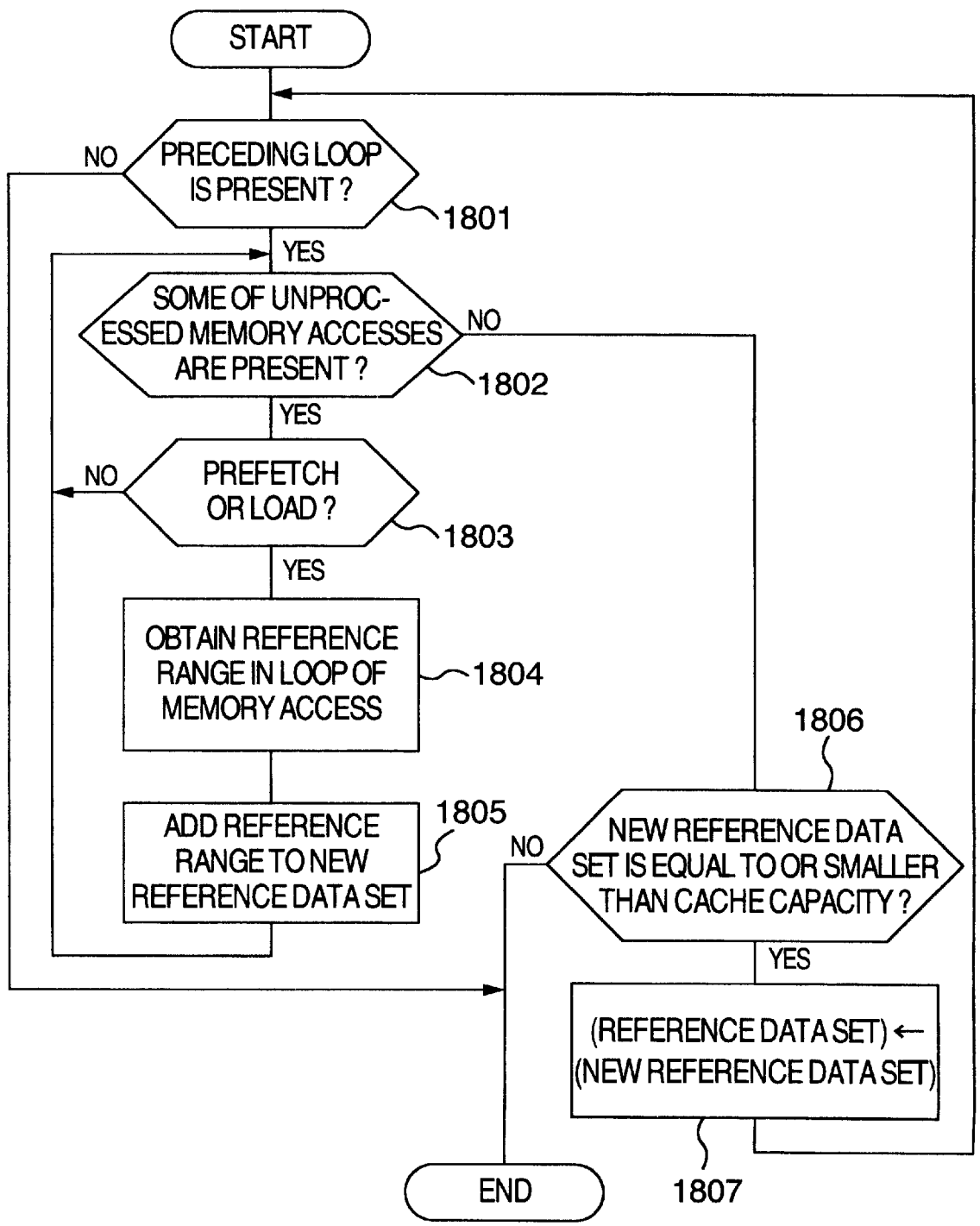
FIG. 18 is a flow chart useful in explaining the processing procedure of analyzing the reference data of a leading loop in the judgement for a memory access according to the present invention.

FIG. 18 shows the detailed processing procedure of the present Step. The processings in Steps will hereinbelow be described.

In Step 1801, it is judged whether or not the preceding loop is present. The preceding loop carries out the tracing in such a way as to be conformed to the preceding loop field 1703 of the loop table. If it is judged in Step 1801 that the preceding loop is present, then the preceding loop of interest is extracted and then the processing proceeds to Step 1802. On the other hand, if it is judged in Step 1801 that the preceding loop is absent, then the processing is completed.

In Step 1802, it is checked whether or not some of the unprocessed memory accesses are present in the preceding loop which has been extracted. If it is judged in Step 1802 that some of the unprocessed memory accesses are present in the preceding loop which has been extracted, then the processing proceeds to Step 1803. On the other hand, if it is judged in Step 1802 that any of the unprocessed memory accesses is absent in the preceding loop which has been extracted, then the processing proceeds to Step 1806. In Step 1803, the access method of the memory access is checked up from the access method registration table. Then, if it is judged in Step 1803 that the access method is either the prefetch or the load, then the processing proceeds to Step 1804. On the other hand, if it is judged in Step 1803 that the access method is neither the prefetch nor the load, i.e., it is judged in Step 1803 that the access method is the preload, then the processing is returned back to Step 1802 in which a next memory access is in turn processed.

The processings in Step 1804 and Step 1805 are the processings relating to either the prefetch or the load, i.e., the memory access to access the cache memory. In Step 1804, the reference range in the loop of the present memory access is obtained. In Step 1805, the reference range is added to a new reference data set of the preceding loop. For example, in the case where the memory access a[i] is present, and also the range of the loop control variable i is $1 \leq i \leq 100$, a[1:100] is added to the new reference data set.

In Step 1806, it is checked whether or not the new reference data set is equal to or smaller than the capacity of the cache memory. If it is checked in Step 1806 that the new reference data set is equal to or smaller than the capacity of the cache memory, then the processing proceeds to Step 1801 in which the new reference data set is in turn set to the reference data set, and then the processing is returned back to 1801 in which the next leading loop is in turn processed. On the other hand, if it is checked in Step 1806 that the new reference data set exceeds the capacity of the cache memory, then the processing is completed. This results from the fact that even if the preceding loop is checked up beyond this processing, it has been driven from the cache memory at the entry of the subject loop of the current judgement of an access method. In this case, the reference data of the loop which has been processed finally are not added to the reference data set.

Figure 19:
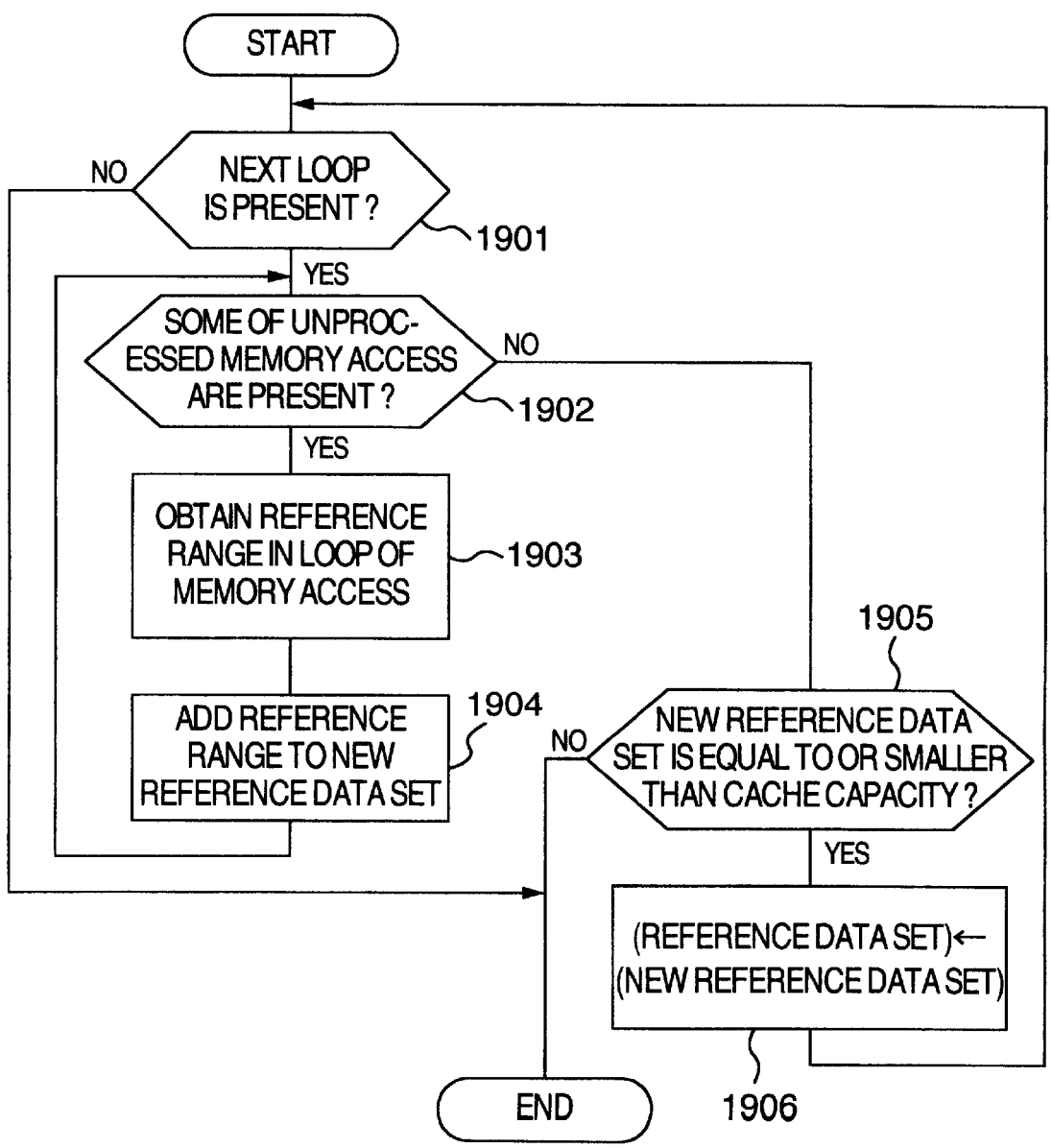
FIG. 19 is a flow chart useful in explaining the processing procedure of analyzing the reference data of a trailing loop in the judgement for a memory access method according to the present invention.

The processing in Step 1604 also relates to the analysis of the interloop to analyze the reference data of the following loop. By the following loop is meant the loop which will be executed after the current processing loop. The detailed processing procedure of the present Step will hereinbelow be described with reference to FIG. 19.

In Step 1901, a next loop is extracted in accordance with a next loop field 1704 of the loop table. If it is judged in Step 1901 that the next loop is absent, then the processing is completed.

In Step 1902, it is checked whether or not some of the unprocessed memory accesses are present in the loop which has been extracted. If it is checked in Step 1902 that some of the unprocessed memory accesses are present in the loop which has been extracted, then the processing proceeds to Step 1903. On the other hand, if it is checked in Step 1902 that any of the unprocessed memory access is absent in the loop which has been extracted, then the processing proceeds to Step 1905.

In Step 1903, the reference range in the loop of the memory access is obtained, and then in Step 1904, the reference range thus obtained is added to a new reference data set of a following loop.

In Step 1905, it is checked that the new reference data set is equal to or smaller than the capacity of the cache memory. If it is checked in Step 1806 that the new reference data set is equal to or smaller than the capacity of the cache memory, then the new reference data set is set in the reference data set, and then the processing is returned back to Step 1901. On the other hand, it is checked in Step 1806 that the new reference data set exceeds the capacity of the cache memory, then the processing is completed.

The processing in Step 1605 relates to the analysis of the intraloop. In the present Step, the reuse analysis for the intraloop data is carried out, and the analysis result is registered in a reuse registration table 112.

The reuse registration table is shown in FIG. 20. In a field 2001, a memory access for which the reuse analysis was carried out is registered. The result of the reuse analysis is divided into self-reuse and group reuse which are respectively registered. By the self-reuse is meant the reuse resulting from the fact that when one memory access is referred to any number of times, the same cache line is accessed, while by the group reuse is meant the reuse resulting from the fact that the same cache line is referred to among a plurality of memory accesses. In a field 2002, the information relating to the presence or absence of the self-reuse is registered. In a field 2003, the information of the group reuse is registered. The memory accesses having the group reuse are collected into a set, and the memory access which is initially referred to among the references having the reuse is selected to be made a leading reference. Those are registered in a table consisting of fields 2004, 2005 and 2006. In the field 2003, the number of the group reuse to which the memory access of interest belongs is registered. Since the method of analyzing reuse is the known technique, the detailed description thereof is omitted for the sake of simplicity.

Steps ranging from Step 1606 to Step 1609 are the processings for the memory accesses in the loop. In Step 1606, it is judged whether or not some of the unprocessed memory accesses are present in the loop. If it is judged in Step 1606 that any of the unprocessed memory accesses is absent in the loop, then the processing is returned back to Step 1602 in which the processing of a next loop is in turn executed. On the other hand, if it is judged in Step 1606 that some of the unprocessed memory accesses are present in the loop, then the processing proceeds to Step 1607 in which the memory access is in turn fetched to be made the processing subject. In Step 1608, an access method for the memory access which has been fetched is selected. In Step 1609, the access method which has been selected in Step 1608 is set in the access method registration table 111, and then the processing is returned back to Step 1606 in which a next memory access is in turn processed.

Figure 21:
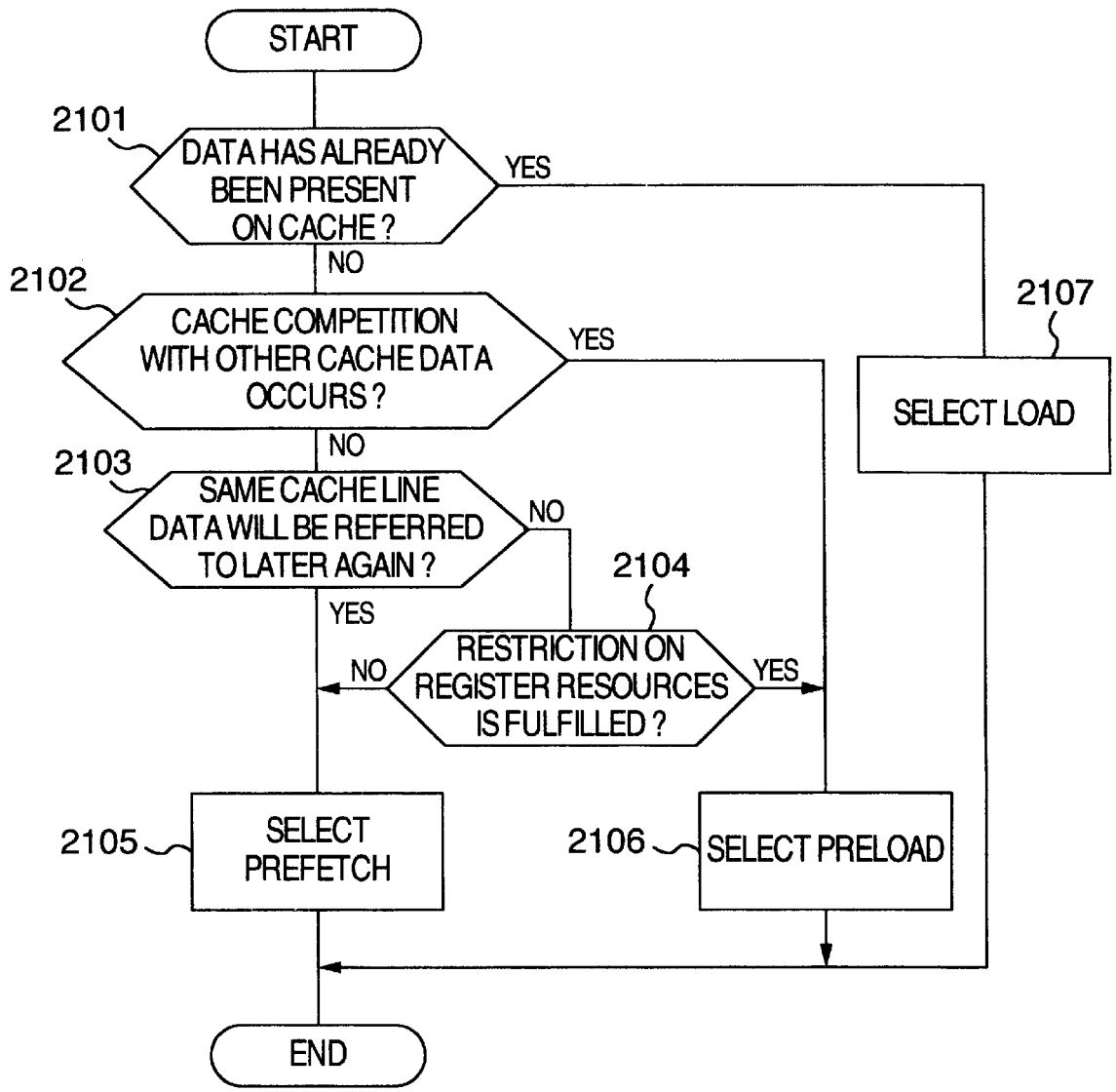
FIG. 21 is a flow chart useful in explaining the processing procedure of selecting an access method in the judgement for a memory access method according to the present invention.

FIG. 21 shows the details of the processing of selecting an access method shown in FIG. 1608. This processing procedure is the most characteristic part of the present embodiment. The processings in Steps will hereinbelow be described one by one.

In Steps 2101, 2102 and 2103, the judgements associated with the cache memory are respectively carried out. In Step 2101, it is judged whether or not the subject data for the memory access has already been present on the cache memory. If it is judged in Step 2101 that the subject data for the memory access has already been present on the cache memory, then the processing proceeds to Step 2107 in which the load is in turn selected as an access method. On the other hand, if it is judged in Step 2101 that the subject data for the memory access is absent on the cache memory, then the processing proceeds to Step 2102. In Step 2102, it is judged whether or not the memory access of the processing subject competes with other cache data for a cache. If it is judged in Step 2102 that the memory access of the processing subject competes with other cache data for a cache, then the processing proceeds to Step 2106 in which the preload is in turn selected as an access method. On the other hand, if it is judged in Step 2102 that the memory access of the processing subject does not compete with other cache data for a cache, then the processing proceeds to Step 2103. In Step 2103, it is checked whether or not the data in the same cache line as that for the memory access of the processing subject will be referred to later once again. If it is checked in Step 2103 that the data in the same cache line as that for the memory access of the processing subject will be referred to later once again, then the processing proceeds to Step 2105 in which the prefetch is in turn selected as an access method. On the other hand, if it is checked in Step 2103 that the data in the same cache line as that for the memory access of the processing subject will not be referred to later once again, then the processing proceeds to Step 2104.

In Step 2104, the judgement relating to the register resources is carried out. Since the memory access to which the preload is applied occupies the register for a long time, it is an object of Step 2104 to prevent the register deficiency due to the over-use of the preload. If it is judged in Step 2104 that the restriction conditions on the register resources are fulfilled, then the processing proceeds to Step 2106 in which the preload is in turn selected as an access method. If it is judged in Step 2104 that the restriction conditions on the register resources are not fulfilled, then the processing proceeds to Step 2105 in which the prefetch is in turn selected as an access method.

The details of the judgements on the conditions in Steps 2101, 2102, 2103 and 2104 will hereinbelow be described.

Figure 22:
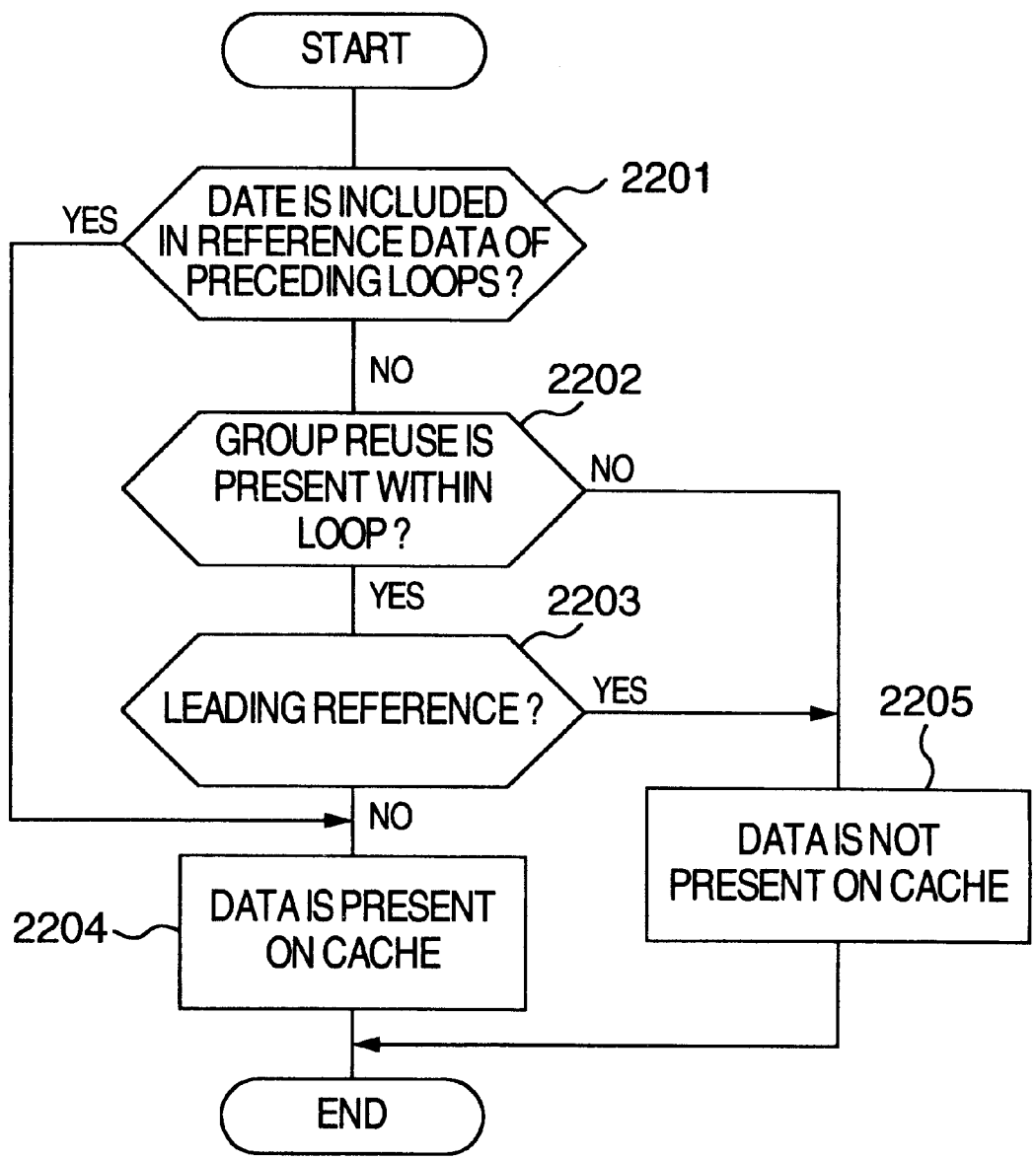
FIG. 22 is a flow chart useful in explaining the processing procedure of judging whether or not data are present on a cache memory in the selection of an access method according to the present invention.

FIG. 22 shows the details of the processing procedure of Step 2101. The processings in Steps will hereinbelow be described.

In Step 2201, by referring to the reference data set of the preceding loops which was analyzed in Step 1603, it is judged whether or not the memory access which is being currently processed is included in the reference data set of the preceding loops. If it is judged in Step 2201 that the memory access which is being currently processed is included in the reference data set of the leading loop, since the data have been written to the cache memory in the preceding loop, the processing proceeds to Step 2204 in which it is judged in turn that the data are present on the cache memory, and then the processing is completed. On the other hand, if it is judged in Step 1603 that the data are not included in the reference data set of the preceding loop, then the processing proceeds to Step 2202.

In Step 2202, by referring to the reuse registration table which was produced on the basis of the analysis in Step 1605, it is judged whether or not the group reuse is present in the reuse registration table. If it is judged in Step 1605 that the group reuse is absent in the reuse registration table, then the processing proceeds to Step 2205 in which it is judged in turn that the data is absent on the cache memory. On the other hand, if it is judged in Step 1605 that the group reuse is present in the reuse registration table, then the processing proceeds to Step 2203 in which it is judged in turn whether or not the reference of interest is the leading reference of the group reuse. The group reuse executes the processing of writing the data from the main storage device to the cache memory in the reference of the leading reference, while utilizes the cache memory once again in the remaining references. Therefore, when the reference of interest is the leading reference, the processing proceeds to Step 2205 in which it is judged in turn that the data are absent on the cache memory. On the other hand, when the reference of interest is not the leading reference, the processing proceeds to Step 2204 in which it is judged in turn that the data are present on the cache memory.

The processing in Step 2201 relates the analysis of the interloop to check whether or not the data are present on the cache memory at the loop entry. The processings in Step 2202 and Step 2203 relate to the analysis of the intraloop to check whether or not the reference data are written to the cache memory by any of other memory accesses for a period of time ranging from a time point of the loop start to a time point right before the access.

Figure 23:
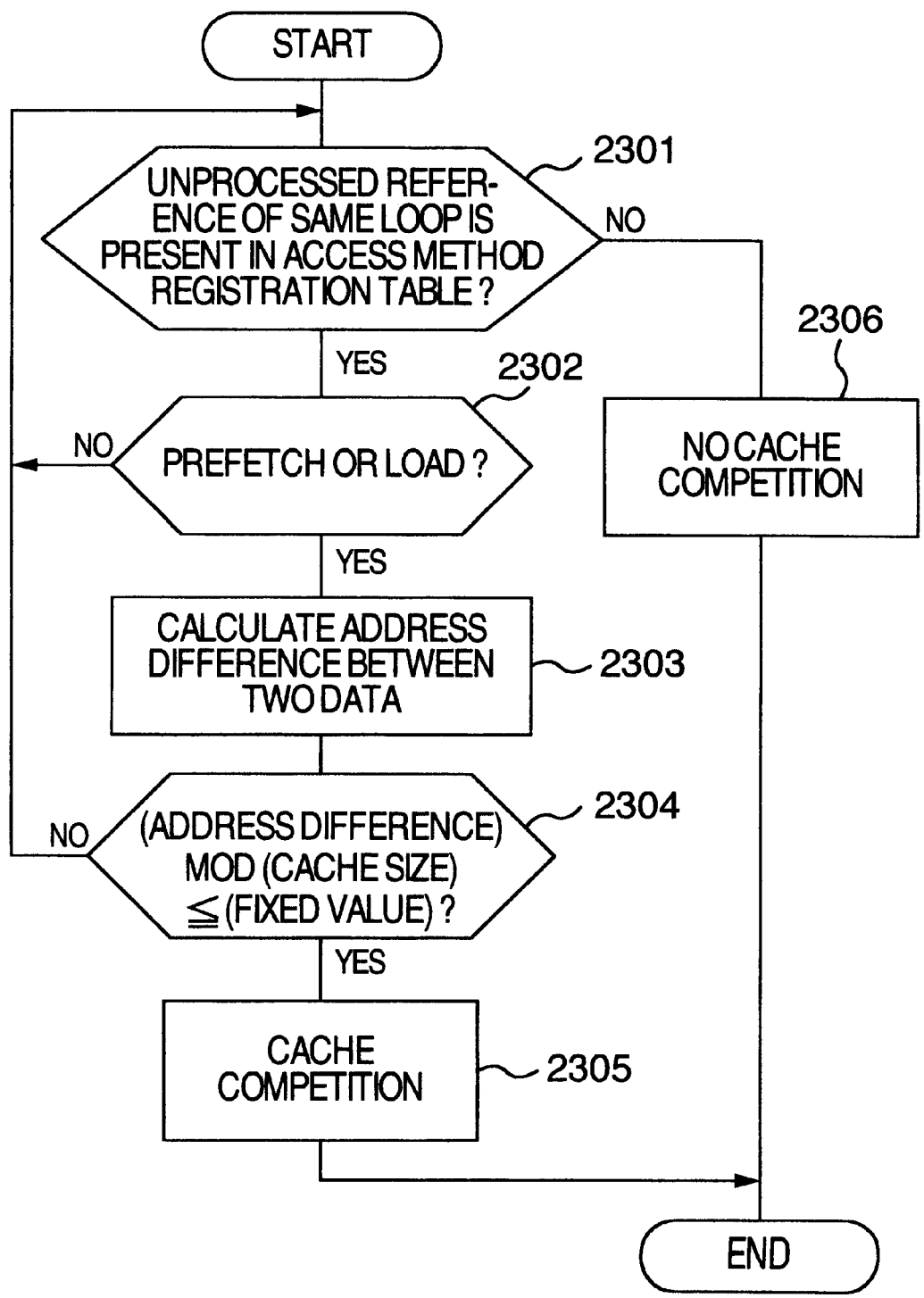
FIG. 23 is a flow chart useful in explaining the processing procedure of analyzing the competition for a cache memory in the selection of an access method according to the present invention.

FIG. 23 shows the processing procedure for the judgement of the competition for cache in Step 2102. The present analysis is to check up the competition with other references in the loop for a cache.

In Step 2301, it is checked whether or not some of the unprocessed references which belong to the same loop are registered in the access method registration table. If it is checked in Step 2301 that some of the unprocessed references which belong to the same loop are registered in the access method registration table, then some of the references are extracted, and then the processing proceeds to Step 2302. On the other hand, if it is checked in Step 2301 that any of the unprocessed references which belong to the same loop are not registered in the access method registration table, then the processing proceeds to Step 2306 in which it is judged in turn that the competition is not carried out for a cache, and then the processing is completed.

In Step 2302, it is checked whether the access method of the unprocessed reference which has been extracted is either the prefetch or the load. If it is checked in Step 2303 that the access method of the unprocessed reference which has been extracted is either the prefetch or the load, then the data are written to the cache memory and hence the processing proceeds to Step 2303 in which the competition is in turn checked up for a cache. On the other hand, if it is checked in Step 2303 that the access method of the unprocessed reference which has been extracted is neither the prefetch nor the load, since the access method is the preload and hence any of data is not written to the cache memory, the processing is returned back to Step 2301.

In Step 2303, an address difference between the reference in being currently processed and the reference which has been extracted in Step 2301 is arithmetically determined. In Step 2304, it is judged whether or not the remainder which has been obtained by dividing that address difference by the cache memory size is equal to or smaller than a fixed value. If it is judged in Step 2304 that the remainder which has been obtained by dividing that address difference by the cache memory size is equal to or smaller than a fixed value, then the processing proceeds to Step 2305 in which it is judged in turn that the competition is carried out for a cache, and then the processing is completed. On the other hand, if it is judged in Step 2304 that the remainder which has been obtained by dividing that address difference by the cache memory size is not equal to or smaller than a fixed value, since for the two references, the competition is not carried out for a cache, the processing is returned back to Step 2301 in which a next unprocessed reference is in turn checked up.

Next, the details of the processing in Step 2103 will hereinbelow be described.

Figure 24:
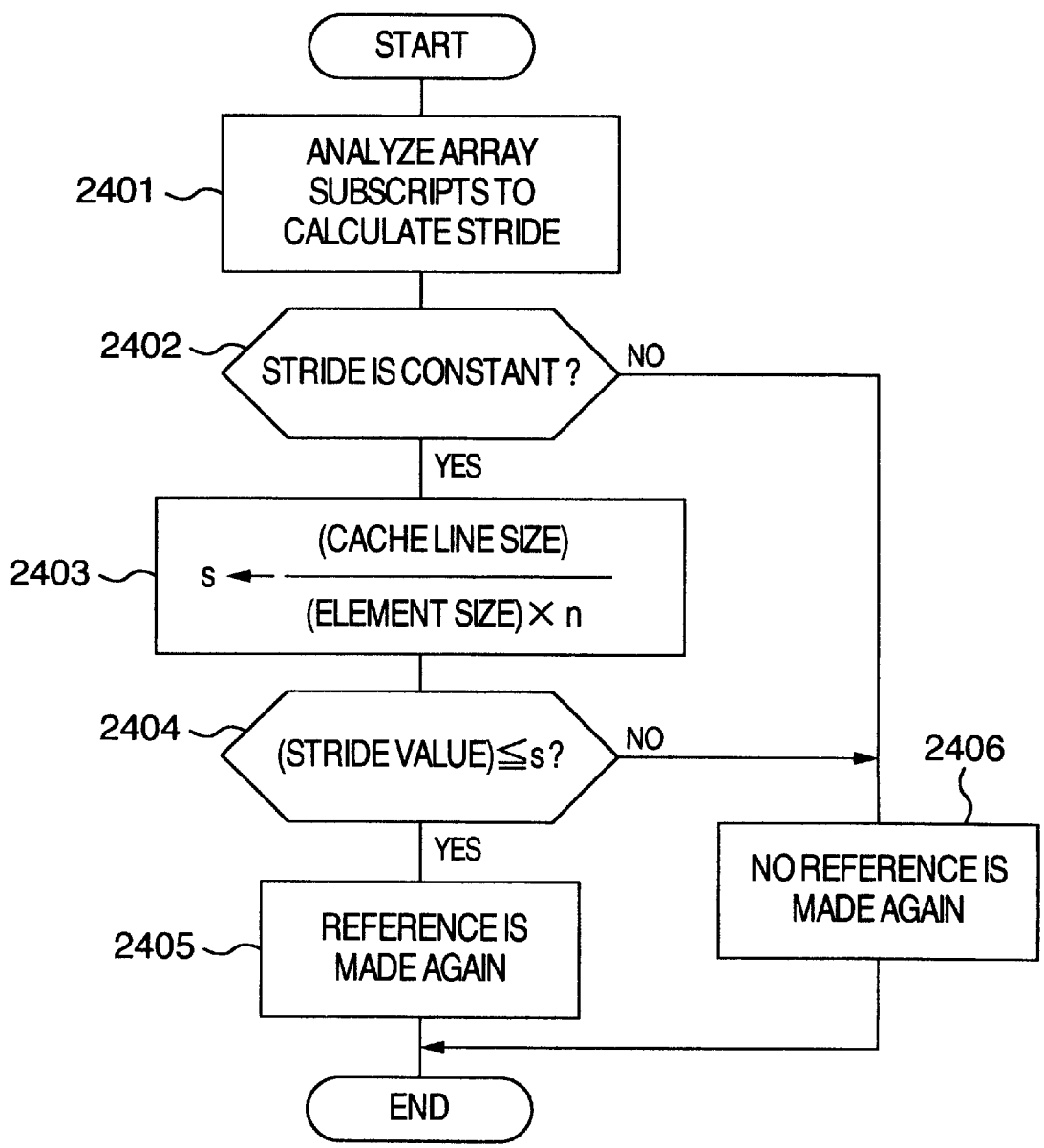
FIG. 24 is a flow chart useful in explaining the processing procedure of judging whether or not data will be referred to later again in the selection of an access method according to the present invention.

First of all, the judgement by the analysis of the subscripts of the memory accesses will now be described as the simple judgement method. The processing procedure thereof is shown in FIG. 24.

In Step 2401, the subscripts of an array are analyzed to determine arithmetically the stride. The stride exhibits that the interval between the references of the successive iterations corresponds to how many elements of an array. In this connection, when the subscripts of an array are expressed in the form of a linear expression of a loop control variable, the stride is fixed, and the product of the incremental value of the loop control variable and the coefficient of the loop control variable in the subscript expression is the stride value.

In Step 2402, it is judged whether or not the stride is a constant. If it is judged in Step that the stride is not a constant, then the processing proceeds to Step 2405 in which it is judged in turn that the reference to the same cache line is not carried out once again, and then the processing is completed. On the other hand, if it is judged in Step 2402 that the stride is a constant, then the processing proceeds to Step 2403.

In Step 2403, a reference value for the stride judgement is arithmetically determined. The value which is obtained by dividing the cache line size by the product of the element size of an array and n is arithmetically determined as the stride value which is used to access one cache line n times, and the resultant value is made s.

In addition, in Step 2403, it is judged whether or riot the value of the stride is equal to or smaller than the reference value s. If it is judged in Step 2403 that the value of the stride is equal to or smaller than the reference value s, since the cache line is accessed n times or more, the processing proceeds to Step 2405 in which it is judged in turn that the reference to the cache line is made once again, and then the processing is completed. On the other hand, if it is judged in Step 2403 that the value of the stride is not equal to or smaller than the reference value s, then the processing proceeds to Step 2406 in which it is judged in turn that no reference to the cache line is made once again.

Figure 25:
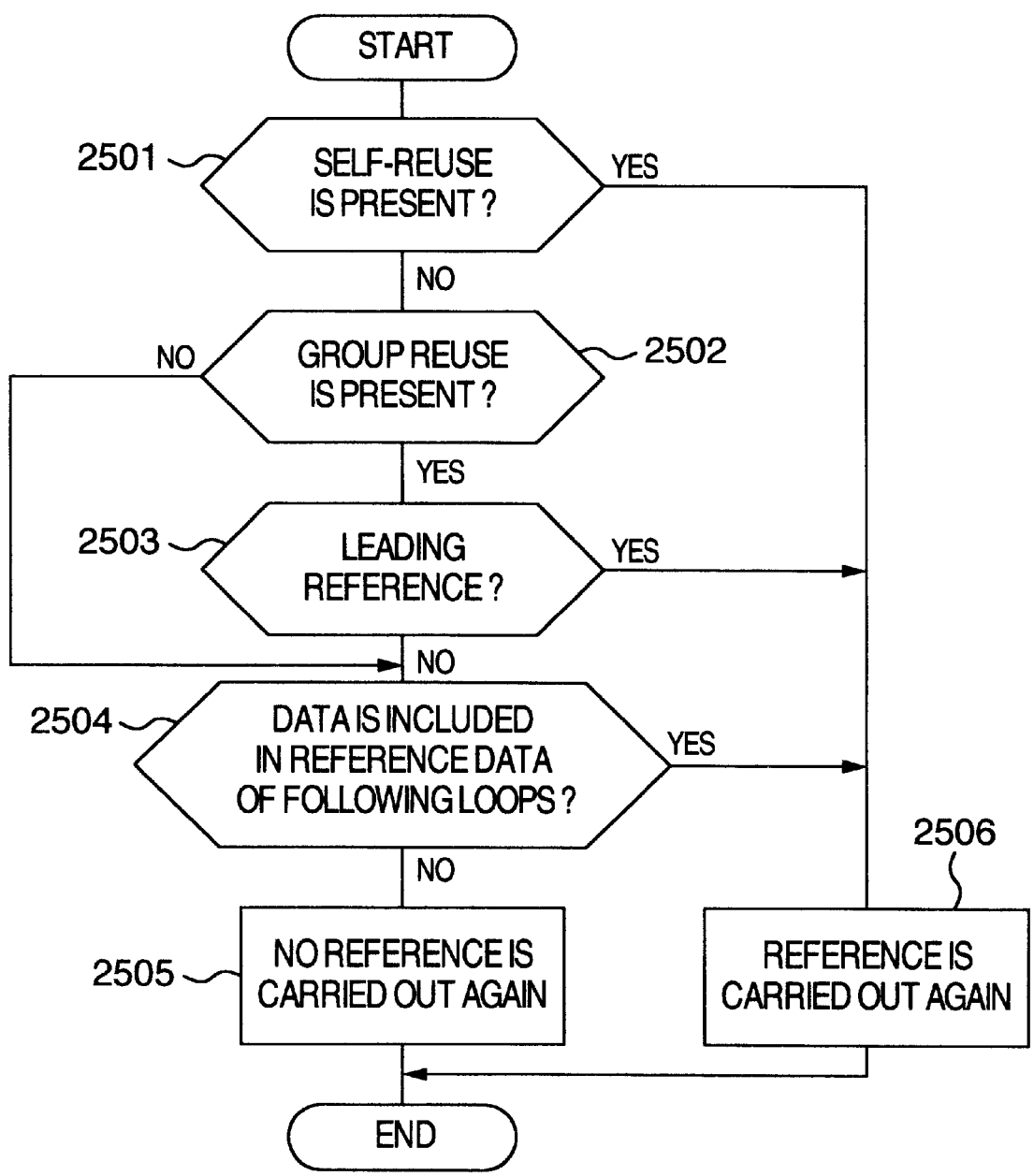
FIG. 25 is a flow chart useful in explaining the processing procedure of judging whether or not data will be referred to later again in the selection of an access method according to the present invention.

Next, the description will hereinbelow be given with respect to a method of employing the analysis result of Steps 1604 and 1605 as another processing procedure in Step 2103. The processing procedure thereof is shown in FIG. 25.

In Step 2501, it is judged by referring to the reuse registration table whether or not the self-reuse is present. If it is judged in Step 2501 that the self-reuse is present, then the processing proceeds to Step 2506 in which it is judged in turn that the reference is made once again. On the other hand, if it is judged in Step 2501 that the self-reuse is absent, then the processing proceeds to Step 2502.

In Step 2502, it is judged by referring to the reuse registration table whether or not the group reuse is present. If it is judged in Step 2502 that the group reuse is present, then the processing proceeds to Step 2503 in which it is judged in turn whether or not the reference of interest is the leading reference. If it is judged in Step 2503 that the reference of interest is the leading reference, since the reuse by any of other references in the same group is present, then the processing proceeds to Step 2506 in which it is judged in turn that the reference to the cache line is made once again. On the other hand, if it is judged in Step 2503 that the reference of interest is not the leading reference, then the processing proceeds to Step 2504.

Step 2504 is Step of checking the re-reference between the loops. That is, in Step 2504, the reference data of the following loops which was analyzed in Step 1604 are analyzed to judge whether or not the memory access as the processing subject is included in the reference data of the following loops. If it is judged in Step 2504 that the memory access as the processing subject is included in the reference data of the following loops, then the processing proceeds to Step 2506 in which it is judged in turn that the reference to the cache line is made once again. On the other hand, if it is judged in Step 2504 that the memory access as the processing subject is not included in the reference data of the following loops, then the processing proceeds to Step 2505 in which it is judged in turn that no reference to the cache line is made once again.

Above, the description of the processing procedure in FIG. 24, FIG. 25 and Step 2103 has been completed.

Figure 26:
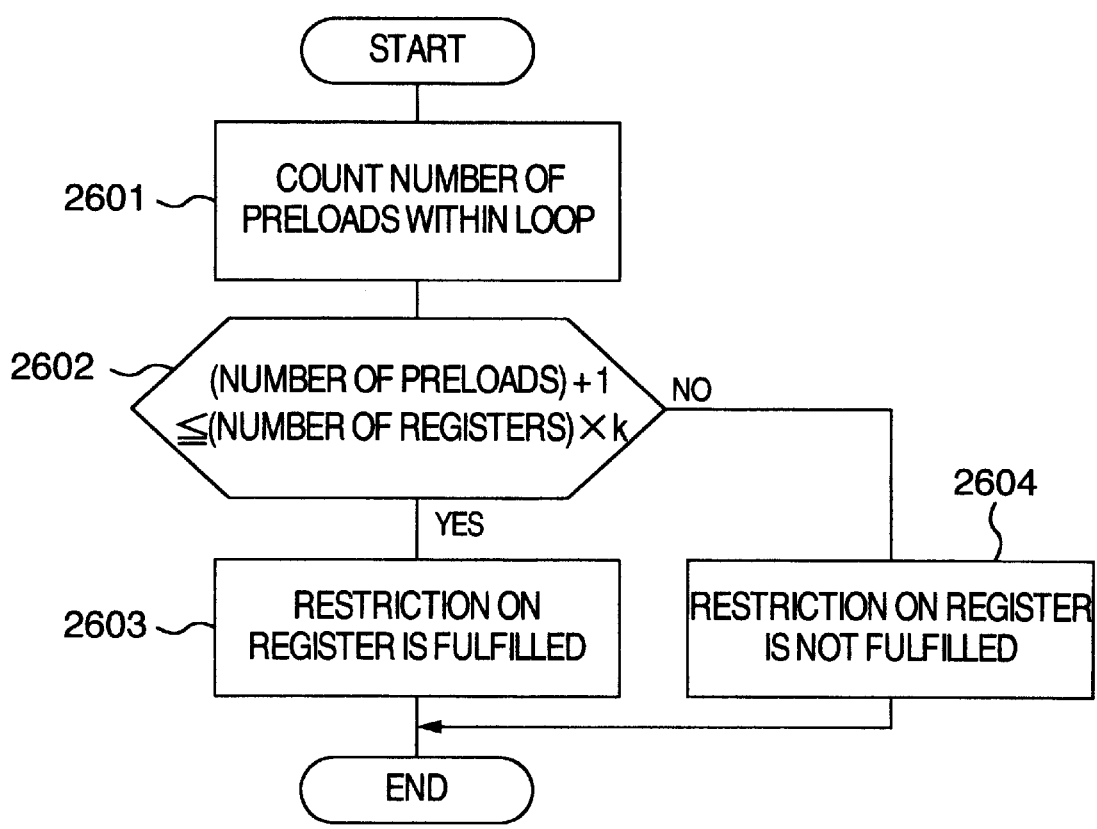
FIG. 26 is a flow chart useful in explaining the processing procedure of judging whether or not register resources are restricted in the selection of an access method according to the present invention.

Next, the description will hereinbelow be given with respect to the judgement for the restriction on the register resources in Step 2104. The details of the processing procedure of the present Step is shown in FIG. 26.

In Step 2601, the number of memory accesses in the same loop each of which has already been determined to be the preload is counted on the basis of the reference to the access method registration table.

Step 2602 is Step of judging whether or not the number of preloads fulfills the restriction on the register resources. While the optimal restriction conditions on the register resources depend on the scheduling method and the like, in the present embodiment, it is assumed that the value which is obtained by multiplying the number of registers by a fixed coefficient k is made the upper limit value of the number of preloads. For example, in the case where it is assumed that the number of registers is 32 and the coefficient k is 0.5, the number of preloads is set in such a way as not to exceed 16. If the relation of (the number of preloads)+1≦(the number of registers)×k is established, then the processing proceeds to Step 2603 in which it is judged in turn that the restriction on the register resources is fulfilled. On the other hand, if it is judged in Step 2602 that the above relation is not fulfilled, then the processing proceeds to Step 2604 in which it is judged in turn that the restriction on the register resources is not fulfilled.

Above, the description of the processing procedure in the second embodiment has been entirely completed.

Next, the processing process by the present embodiment will hereinbelow be described using an example of a program. FIG. 27 shows an example of a source program.

The judgement of an access method for the present program is carried out in accordance with the processing procedure shown in FIG. 16.

Since Steps 1601, 1602, 1603 and 1604 are Steps relating to the interloop processings, no processing is required therefor.

In Step 1605, the reuse analysis is carried out so that the results shown in FIG. 20 are obtained. A memory access "c[x[i]]" has no self-reuse since it is the random reference in which the stride is not fixed. Other memory accesses have the self-reuse since they are either the continuous references or the references of a stride 2 and the same cache line is accessed among the successive alterations. The group reuse is analyzed for the reference of the same array. An array "a" has two references "a[i]" and "a[i+2]". Since they may access the same cache line within the same iteration, they are registered as a group number 1. It is assumed that the leading reference is "a[i]". While an array "b" also has two references, since a distance between the two references is large, it is judged that the group reuse is absent. The two references of the array "d" have the group reuse. The element which has been accessed by "d[i+100]" is accessed by "d[i]" after a hundreds of iterations have been carried out. Therefore, this group reuse is registered as a group number 2 with "d[i+100]" as the leading reference.

Next, the description will hereinbelow be given with respect to the judgement of an access method for each of memory accesses (Step 1608). First of all, the access method for "a[i]" is judged. In Step 2101, the judgement conformed to the processing procedure of FIG. 22 is carried out. Since the preceding loop is absent and also the reference of interest is the leading reference of the group reuse, it is judged that any of the data is absent on the cache memory. Next, the processing proceeds to Step 2102 in which the analysis of the competition is carried out for a cache in accordance with the processing procedure of FIG. 23. Since it is judged in Step 2301 that any of other references is unregistered in the access method registration table, the processing proceeds to Step 2306 in which it is judged in turn that the competition is not carried out for a cache. Next, in Step 2103, it is judged whether or not the same cache line will be referred to later once again. The description of the processings in FIG. 24 is omitted and also it is assumed that the processing procedure is conformed to the processing procedure of FIG. 25. Since it is judged in Step 2501 that the self-reuse is present, the processing proceeds to Step 2506 in which it is judged in turn that the reference is made once again. Therefore, in the processing procedure shown in FIG. 21, the processing proceeds to Step 2105 in which the prefetch is in turn selected as an access method. Next, the access method for "a[i+2]" is judged. In Step 2101, since the group reuse is present and also the reference of interest is not leading reference, the processing proceeds to Step 2204 in which it is judged in turn in accordance with the processing procedure shown in FIG. 22 that the data are present on the cache memory. Therefore, the processing proceeds to Step 2107 in which the load is in turn selected as an access method. Next, the array b will now be described. Since "b[2*i]" is the self-reuse, the prefetch is selected as an access method. The description will hereinbelow be given with respect to the processing in Step 2102 of "b[2*i+1024]". In Step 2301, the reference "b[2*i]" which has been registered as the prefetch in the access method registration table is extracted. An address between two data is expressed by 8 bytes×1,024=8 Kbytes. If it is assumed that the cache size is 4 Kbytes, it is judged on the basis of the judgement in Step 2304 that the two data compete with each other for a cache. If the prefetch is applied to both of the two data, then after having prefetched one data, the one data are driven out by the prefetch for the other data so that the effect of the prefetch is lost. In such a case, for the second reference, the prefetch is not selected, and then the processing proceeds to Step 2106 in which the preload is in turn selected as an access method. The description of other references is omitted for the sake of simplicity. In the results of judging a memory access method in such a way, each of a[i], b[i*2], x[i] and d[i+100] becomes the prefetch, each of a[i+2] and d[i] becomes the load, and each of c[x[i]] and b[i*2+1024] becomes the preload.

Next, an example of a program including a plurality of loops will hereinbelow be described. A source program is shown in FIG. 28.

In Step 1601, the processing order of the loops is determined. Since it is preferable that the processing order is conformed to the execution order, the processing is executed in order of LOOP1, LOOP2, LOOP3 and LOOP4. These loops are registered in the loop table as shown in FIG. 17. The description will hereinbelow be given with respect to the processing procedure for the second loop which is commented as "LOOP2".

In Step 1603, the reference data of the preceding loops are analyzed in accordance with the processing procedure shown in FIG. 18. In Step 1801, LOOP1 is extracted as the preceding loop. In Step 1802, the memory access "a[i]" is extracted. It is assumed that the prefetch is designated for the access method of "a[i]" in LOOP1. In Step 1804, the reference range is obtained. Since a lower limit value of a control variable is 0, a upper limit value thereof is 99 and an incremental value thereof is 1, the reference range becomes a[0:99]. Since in Step 1805, a new reference data set becomes {a[0:99]} and then when the processing is returned back to Step 1802, any of other memory accesses is absent, the processing proceeds to Step 1806. The capacity of the data which are referred to in the new reference data set is 8 bytes×100=800 bytes. In the present embodiment, the cache size is assumed to be 4 Kbytes. Since the new reference data set is equal to or smaller than the cache capacity, in Step 1807, the reference data set is made {a[0:99]}. Since after the processing has been returned back to Step 1801, it is judged that the preceding loop is absent, and then the processing is completed.

Next, in Step 1604, the reference data of the following loops is analyzed. In Step 1901, LOOP3 is extracted as a next loop. The memory access "b[i]" is analyzed and as a result, a new reference data set becomes {b[0:399]}. Since the capacity of the data which are referred to in the new reference data set is 8 bytes×400=3,200 bytes and this data capacity is equal to or smaller than the cache capacity, this new reference data set is made the reference data set and then LOOP4 is checked up. When adding the reference range of a memory access "c[i]" to the new reference data set, the set of {b[0:399], c[0:399]} is obtained. Since the capacity of the data which are referred to in this set is 6,400 bytes and this data capacity exceeds the cache size of 4 Kbytes, the processing is completed. As a result, {b[0:399]} is obtained as the reference data set of the following loops.

Next, in Step 1605, the reuse analysis is carried out with respect to the memory accesses a[i], b[i*4] and c[i*4] within the loop. The group reuse is not present. The memory access a[i] has the self-reuse. If it is assumed that the cache line size is 32 bytes, since each of b and c accesses one line only one time, each of b[i*4] and c[i*4] does not have the self-reuse.

Next, an access method for each of the memory accesses is selected. First of all, the memory access a[i] is checked up. In Step 2101, it is checked whether or not the data have already been present on the cache memory. Since it is judged in Step 2201 that the reference range a[0:99] of a[i] is included in the reference data set of the preceding loops, it is judged that the associated data are present on the cache memory, and the load is selected as an access method. Next, the memory access b[i*4] is checked up. It is judged in Step 2101 that any of the data is absent on the cache memory since b is not included in the reference data set of the preceding loops and also does not have the group reuse. It is judged in Step 2102 that the competition is not carried out for a cache. It is checked up in Step 2103 in accordance with the processing procedure of FIG. 25 whether or not the data on the same cache line will be referred to later once again. Since b does not have the reuse, the processing proceeds to Step 2504 through the judgements in Step 2501 and Step 2502. Since the reference range of b[i*4] is b[0:396] and hence is included in the reference data set of the following loops, it is judged that the reference is made once again. Then, the processing proceeds to Step 2105 in which the prefetch is in turn selected as an access method. Next, c[i*4] is checked up. Since c is not included in the reference data set of the preceding loops and also does not have the group reuse, it is judged that any of the data is absent on the cache memory. In addition, it is also judged that the competition is not carried out for a cache. Since in the processing shown in FIG. 25, c does not have the reuse and also is not included in the reference data of the following loops, it is judged that no reference is made once again. Then, the processing proceeds to Step 2104 in which the restriction on the register resources is checked up. If it is assumed that the number of registers is 32 and the coefficient k is 0.5, the restriction thereon is fulfilled since the preload and other memory accesses which have already been registered are both absent within the loop, and then the preload is selected as an access method in Step 2106.

Above, the description of the processing procedure for the judgement of a memory access method for the program shown in FIG. 28 has been completed, and hence the description of the second embodiment has also been completed.

INDUSTRIAL APPLICABILITY

According to the present invention, it is possible to select an access method such as prefetch, preload or load which, for each of memory accesses within a loop, is more suitable for the associated memory access. As a result, it is possible to generate a code which uses the preload and the prefetch together with each other, and hence it is possible to generate an object code having higher execution performance.

What is claimed is:

1. For use in an architecture including a prefetch mechanism for writing data on a main storage device to a cache memory, and a preload mechanism for not writing the data on said main storage device to said cache memory, but loading directly the data into a register, a memory access optimizing method of outputting a code utilizing both of said prefetch mechanism and said preload mechanism, said method comprising:

an access method judgement step of judging which of load for writing directly data from said cache memory to said register, prefetch for loading the data from said cache memory after having written the data to said cache memory, or preload is applied to the associated one of memory accesses on a program;

a step of generating a preload code for a reference which has been judged to be the preload in said access method judgement step; and a step of generating a prefetch code for a reference which has been judged to be the prefetch in said access method judgement step, said access method judgement step having:

a step of analyzing the designation of an access method in said program, wherein for the reference which has been designated as either the prefetch or the preload by the analysis, an access method is judged in accordance with said designation.

2. A memory access optimizing method according to claim 1, wherein the designation of said access method is carried out in loop unit within a program source or a compiler command line, and also is carried out with an array name, or an array element to be prefetched or preloaded.

3. For use in an architecture including a prefetch mechanism for writing data on a main storage device to a cache memory, and a preload mechanism for not writing the data on said main storage device to said cache memory, but loading directly the data into a register, a memory access optimizing method of outputting a code utilizing both of said prefetch mechanism and said preload mechanism, said method comprising:

an access method judgement step of judging which of load, prefetch or preload should be applied to the associated one of memory accesses on a program;

a step of generating a preload code for a reference which has been judged to be preloaded in said access method judgement step; and a step of generating a prefetch code for a reference which has been judged to be the prefetch in said access method judgement step, wherein said access method judgement step is to carry out the judgement based on the situation of utilization of cache memory or register resources.

4. A memory access optimizing method according to claim 3, wherein said access method judgement step includes:

a step of judging a stride indicating a reference distance of the memory access between successive iterations in number of elements; and a step of determining a reference stride value as the reference for a stride value for judging an access method, wherein the prefetch is selected for the reference in which the stride is equal to or smaller than the reference stride value, while the preload is selected for other references in order to carry out the judgement.

5. A memory access optimizing method according to claim 4, wherein said step of determining a reference stride value performs the determination on the basis of data size which is written to the cache memory through one time of prefetch, and data size to which one time of memory access refers.

6. A memory access optimizing method according to claim 3, wherein said access method judgement step has a step of analyzing a re-reference made to the same cache line between the memory accesses;

if a re-reference is present to the data which is to be executed previously, the load is selected;

if a re-reference is present to the data which is to be executed later, the prefetch is selected; and if a re-reference is not present, the preload is selected in order to carry out the judgement.

7. A memory access optimizing method according to claim 3, wherein said access method judgement step has a step of analyzing cache competition between the memory accesses; and for the data which competes with other data for cache when the prefetch is selected as the access method, the preload is selected in order to carry out the judgement.

8. A memory access optimizing method according to claim 3, wherein said access method judgement step has a step of judging the situation of occupation of the register for the memory access in the loop when the preload is selected as the access method; and when the situation of occupation of the register fulfills predetermined conditions, the prefetch is selected to carry out the judgement.

9. A memory access optimizing method according to claim 6, wherein said step of analyzing a re-reference made to the same cache line between the memory accesses includes:

a step of analyzing a re-reference between the references which belong to the same loop; and a step of analyzing a re-reference between the references between the difference loops, said step of analyzing a re-reference between the references between the difference loops further includes:

a step of analyzing the sum of the reference ranges of the memory access for which either the prefetch or the load within the loop to be executed previously is selected; and a step of analyzing the sum of the reference ranges of the memory access within the loop to be executed later.

* * * * *